(12) United States Patent  
Kurabayashi

(10) Patent No.: US 12,370,444 B2  
(45) Date of Patent: Jul. 29, 2025

(54) METHOD, PROGRAM, AND ELECTRONIC DEVICE

(71) Applicant: CYGAMES, INC., Tokyo (JP)

(72) Inventor: Shuichi Kurabayashi, Tokyo (JP)

(73) Assignee: Cygames, Inc., Tokyo (JP)

( * ) Notice: Subject to any disclaimer, the term of this patent is extended or adjusted under 35 U.S.C. 154(b) by 277 days.

(21) Appl. No.: 18/153,190

(22) Filed: Jan. 11, 2023

(65) Prior Publication Data

US 2023/0143964 A1 May 11, 2023

Related U.S. Application Data

(63) Continuation of application No. PCT/JP2021/026400, filed on Jul. 14, 2021.

(30) Foreign Application Priority Data

Jul. 14, 2020 (JP) ................. 2020-120603

(51) Int. Cl.
| | | |
|---|---|---|
| *A63F 13/42* | (2014.01) | |
| *A63F 13/214* | (2014.01) | |
| *A63F 13/2145* | (2014.01) | |
| *G06F 3/04845* | (2022.01) | |
| *G06F 3/0488* | (2022.01) | |

(52) U.S. Cl.
CPC ............ *A63F 13/42* (2014.09); *A63F 13/214* (2014.09); *A63F 13/2145* (2014.09); *G06F 3/04845* (2013.01); *G06F 3/0488* (2013.01)

(58) Field of Classification Search
CPC .... A63F 13/42; A63F 13/214; A63F 13/2145; G06F 3/04845; G06F 3/0488
See application file for complete search history.

(56) References Cited

U.S. PATENT DOCUMENTS

| | | |
|---|---|---|
| 2006/0052166 A1 | 3/2006 | Ohta |
| 2013/0267316 A1 | 10/2013 | Ohta |
| (Continued) | | |

FOREIGN PATENT DOCUMENTS

| | | |
|---|---|---|
| JP | 3734820 B1 | 1/2006 |
| JP | 6389581 B1 | 9/2018 |
| JP | 6560801 B1 | 8/2019 |

OTHER PUBLICATIONS

International Search Report issued in Application No. PCT/JP2021/026400 mailed on Oct. 12, 2021 (5 pages).

(Continued)

*Primary Examiner* — Yingchuan Zhang
(74) *Attorney, Agent, or Firm* — Osha Bergman Watanabe & Burton LLP

(57) ABSTRACT

One or more embodiments of the invention is a method that is executed on a computer equipped with a touch panel, wherein an angle indicated by a set of data points is determined on the basis of the data points, the data points being acquired on the basis of a user operation on the touch panel; for each predefined period, one or more acquired data points are held as a data point sequence; a displacement speed in the held data point sequence is determined on the basis of a displacement of data points in the data point sequence as well as a weight coefficient; and at least on the basis of the variation of the most recently determined displacement speed with respect to the average of precedingly determined displacement speeds, a weighted speed for determining a parameter of an operable object is determined.

9 Claims, 12 Drawing Sheets

(56) References Cited

U.S. PATENT DOCUMENTS

2017/0319960 A1 11/2017 Ohta
2021/0052984 A1 2/2021 Kurabayashi
2021/0205698 A1 7/2021 Kurabayashi

OTHER PUBLICATIONS

Written Opinion issued in Application No. PCT/JP2021/026400 mailed on Oct. 12, 2021 (3 pages).

$o = a_2 s + b_2$ $o = a_3 e^s + b_3$

METHOD, PROGRAM, AND ELECTRONIC DEVICE

TECHNICAL FIELD

The present invention relates to methods, programs, and electronic devices. In particular, the present invention relates to a method that is executed on a computer equipped with a touch panel, a program for executing individual steps of a method, and an electronic device equipped with a touch panel.

BACKGROUND ART

With recent improvements in touch panel technology, electronic devices of the type in which user inputs are performed via a user interface on a touch panel have become widely used. Furthermore, with games that are executed on an electronic device, instead of user inputs via a conventional physical controller, the form in which user inputs are performed via a touch panel provided on an electronic device is becoming widely used.

In particular, compact portable electronic devices, such as smartphones, have rapidly become popular, and a large number of games that are executed on such portable electronic devices have been released. In this situation, various technologies have been proposed concerning methods of operating a virtual object displayed on a touch panel, such as a player character.

For example, Patent Literature 1 discloses a game device equipped with a touch panel, as well as a program, with which an origin is set in accordance with a touch operation by a user, which allows operations simulating those via a joystick. The game device sets reference coordinates on the basis of coordinates at the time when detection is started in the case where a touch panel makes a transition from a state in which a touch has not been detected to a state in which a touch has been detected, and in the case where touch detection is to be continued after the transition, sets instruction coordinates on the basis of coordinates detected after the transition. Then, the game device recognizes the direction of a vector from the reference coordinates to the instruction coordinates as the direction in which the joystick is tilted and the magnitude of the vector as the degree by which the joystick is tilted. This realizes a virtual joystick, which realizes operations for a virtual object.

CITATION LIST

Patent Literature

PTL 1

Publication of Japanese Patent No. 3734820

PTL 2

Publication of Japanese Patent No. 6389581

PTL 3

Publication of Japanese Patent No. 6560801

SUMMARY OF INVENTION

Technical Problem

In the existing technology disclosed in Patent Literature 1, a user places a finger in contact at one point on the touch panel, causing the game device to recognize the reference coordinates, and slides the finger while maintaining contact, causing the game device to recognize the instruction coordinates with the contact position of the finger after the slide. With the thus-configured existing technology, when the user inputs a direction, it is necessary to generate a distance from the reference coordinates to the instruction coordinates, and thus it has been difficult to realize high responsiveness. For example, in the case where the user wishes to perform an operation of tilting the virtual joystick by a large amount, it has been necessary to generate the magnitude of a vector from the reference coordinates to the instruction coordinates in correspondence with the degree of tilting of the joystick tilted by a large amount.

In this situation, the applicant has proposed methods of determining parameters (e.g., a direction and a speed) of an operable object in a virtual space from a set of touched points arising from fine finger movements, without having to adopt spatial concepts of a start point and an end point (Patent Literatures 2 and 3). However, there is a demand for realizing an operation method that makes it easier for a user to perform operations as an operation method for controlling an operable object, which is an object that may be operated by the user in user operations via a touch panel.

The present invention has been made in order to solve the problem described above, and it is a chief object thereof to provide a method, etc. that make it possible to further improve the ease of operation when an operable object is operated via a touch panel.

Solution to Problem

A method according to an aspect of the present invention is a method that is executed on a computer equipped with a touch panel, the method being characterized by including:

a step of determining an angle indicated by a set of data points on the basis of the data points, the data points being indicated by values along a first axis and values along a second axis, these values being acquired on the basis of a touch event generated in response to a user operation on the touch panel;

a step of holding, for each predefined period, one or more data points as a data point sequence, the one or more data points being indicated by values along the first axis and values along the second axis, these values being acquired on the basis of a touch event generated in response to a user operation on the touch panel; and a step of determining, on the basis of a displacement of data points in the held data point sequence, a displacement speed corresponding to the speed at which the position of generation of the touch event becomes displaced in the data point sequence, and determining, at least on the basis of the variation of the most recently determined displacement speed with respect to the average of precedingly determined displacement speeds, a weighted speed for determining a parameter of an operable object in a virtual space, and the method being characterized in that, in the step of determining a weighted speed, a weight coefficient is calculated according to components along the direction of the first axis and the direction of the second axis in the direction indicated by the determined angle, and a displacement speed is determined further on the basis of the weight coefficient.

Furthermore, according to an aspect of the present invention, in the step of holding one or more data points as a data point sequence, for each period corresponding to a frame rate, one or more data points are held as a data point sequence, and in the step of determining a weighted speed, on the basis of a displacement of data points in a data point sequence held during the period of one frame, a displacement speed corresponding to the speed at which the position of generation of the touch event becomes displaced in that frame is determined, and a weighted speed is determined at least on the basis of the variation of the displacement speed in the most recent frame with respect to the average of displacement speeds in frames preceding the most recent frame.

Furthermore, according to an aspect of the present invention, the step of determining an angle includes:

a step of holding data points indicated by values along the first axis and values along the second axis, these values being acquired on the basis of a touch event generated in response to a user operation on the touch panel;

a step of terminating the holding of a data point for which a predefined holding period has expired among the held data points;

a step of determining the slope of a regression line on the basis of the held data points;

a step of determining the amount of rotation by which the determined slope of the regression line is to be rotated, on the basis of a displacement direction of the held data points as a set; and a step of determining an angle on the basis of the determined slope of the regression line and the determined amount of rotation, and the method includes:

a step of determining, for each predefined period, a resultant vector for determining the parameter of the operable object in the virtual space on the basis of the determined weighted speed, a unit vector having the determined angle, and the weight coefficient calculated according to the components along the direction of the first axis and the direction of the second axis in the direction indicated by the determined angle.

Furthermore, according to an aspect of the present invention, the direction of the resultant vector is a movement direction of the operable object, and the magnitude of the determined resultant vector is a movement speed of the operable object.

Furthermore, according to an aspect of the present invention, the method includes a step of determining a movement status of the operable object on the basis of the magnitude of the determined resultant vector.

Furthermore, a method according to an aspect of the present invention is a method that is executed on a computer equipped with a touch panel, the method being characterized by including:

a step of holding data points indicated by values along a first axis and values along a second axis, these values being acquired on the basis of a touch event generated in response to a user operation on the touch panel;

a step of terminating the holding of a data point for which a predefined holding period has expired among the held data points;

a step of determining the slope of a regression line on the basis of the held data points;

a step of determining the amount of rotation by which the determined slope of the regression line is to be rotated, on the basis of a displacement direction of the held data points as a set;

a step of determining an angle on the basis of the determined slope of the regression line and the determined amount of rotation; and a step of determining, for each predefined period, a resultant vector for determining a parameter of an operable object in a virtual space on the basis of a unit vector having the determined angle, as well as a weight coefficient calculated according to components along the direction of the first axis and the direction of the second axis at the determined angle.

Furthermore, a program according to an aspect of the present invention is characterized by causing a computer to execute the steps of the methods described above.

Furthermore, an electronic device according to an aspect of the present invention is an electronic device equipped with a touch panel, the electronic device being characterized in that:

an angle indicated by a set of data points is determined on the basis of the data points, the data points being indicated by values along a first axis and values along a second axis, these values being acquired on the basis of a touch event generated in response to a user operation on the touch panel;

for each predefined period, one or more data points are held as a data point sequence, the one or more data points being indicated by values along the first axis and values along the second axis, these values being acquired on the basis of a touch event generated in response to a user operation on the touch panel;

on the basis of a displacement of data points in the held data point sequence, a displacement speed corresponding to the speed at which the position of generation of the touch event becomes displaced in the data point sequence is determined, and at least on the basis of the variation of the most recently determined displacement speed with respect to the average of precedingly determined displacement speeds, a weighted speed for determining a parameter of an operable object in a virtual space is determined; and in the determination of a weighted speed, a weight coefficient is calculated according to components along the direction of the first axis and the direction of the second axis in the direction indicated by the determined angle, and a displacement speed is determined further on the basis of the weight coefficient.

Furthermore, an electronic device according to an aspect of the present invention is an electronic device equipped with a touch panel, the electronic device being characterized in that:

data points indicated by values along a first axis and values along a second axis are held, these values being acquired on the basis of a touch event generated in response to a user operation on the touch panel;

the holding of a data point for which a predefined holding period has expired among the held data points is terminated;

the slope of a regression line is determined on the basis of the held data points;

the amount of rotation by which the determined slope of the regression line is to be rotated is determined on the basis of a displacement direction of the held data points as a set;

an angle is determined on the basis of the determined slope of the regression line and the determined amount of rotation; and for each predefined period, a resultant vector for determining a parameter of an operable object in a virtual space is determined on the basis of a unit vector having the determined angle, as well as a weight coefficient calculated according to components along the direction of the first axis and the direction of the second axis at the determined angle.

Advantageous Effects of Invention

The present invention makes it possible to further improve the ease of operation when an operable object is operated via a touch panel.

DESCRIPTION OF EMBODIMENTS

An embodiment of the present invention will be described below with reference to the drawings. The same reference signs signify the same or corresponding parts throughout the drawings unless otherwise specifically mentioned. Furthermore, there are cases where descriptions that are more detailed than necessary are omitted for convenience of description. For example, there are cases where detailed descriptions of matters that are already well known and repeated descriptions of substantially the same configurations are omitted. Note that, in the present description, the magnitude of a vector may mean the norm of that vector.

An electronic device 10 according to the embodiment of the present invention has installed therein a game application that runs a game while presenting virtual objects disposed in a virtual space to a user. The electronic device 10 provides a virtualized controller (virtual controller): for example, when the game application is being executed, the virtual controller is used to control the motion, etc. of an operable object, which is a virtual object that is present in the virtual space and that is operable by the user. The virtual space may be either a two-dimensional space or a three-dimensional space. In this embodiment, the operable object is an operable character, which is a character disposed in the virtual space. For example, with the electronic device 10, parameters such as a direction and a speed of movement of the operable character are determined by using the virtual controller for the input of a direction and a magnitude. Alternatively, the operable object may be an item, a virtual camera, or the like disposed in the virtual space.

For convenience of description, it is assumed that the electronic device 10 has installed therein a game application like the one described above in this embodiment; however, there is no limitation to such a game application. It suffices for the electronic device 10 to have implemented therein an application with which it is possible to control an operable object according to user operations. For example, instead of or in addition to a game application, the electronic device 10 may have implemented therein an input aid application or a simulation application with which an operable object is caused to perform actions according to user operations. In the following description, applications may refer to application programs in general, and may refer to apps that are installed in smartphones or tablets.

Figure 1:
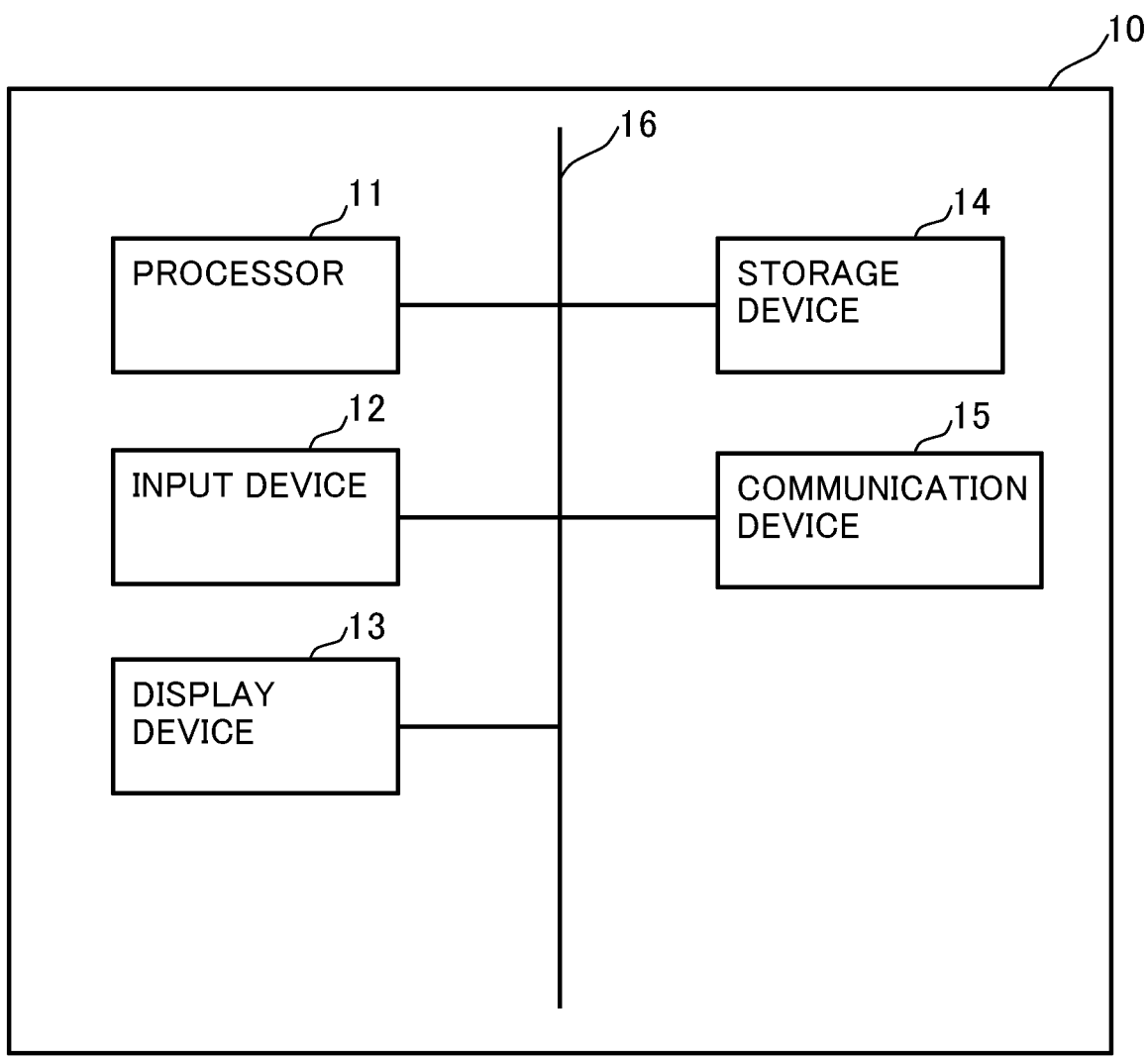
FIG. 1 is a block diagram showing the hardware configuration of an electronic device according to an embodiment of the present invention.

FIG. 1 is a block diagram showing the hardware configuration of an electronic device 10 according to an embodiment of the present invention. The electronic device 10 includes a processor 11, an input device 12, a display device 13, a storage device 14, and a communication device 15. These constituent devices are connected via a bus 16. Note that interfaces are interposed as needed between the bus 16 and the individual constituent devices. In this embodiment, the electronic device 10 is a smartphone. However, the electronic device 10 may be a tablet computer, a computer equipped with a contact-based input device such as a touch pad, or the like that has the configuration described above.

The processor 11 controls the overall operation of the electronic device 10. For example, the processor 11 is a CPU. Alternatively, an electronic circuit such as an MPU may be used as the processor 11. The processor 11 executes various kinds of processing by loading programs and data stored in the storage device 14 and executing the programs. In one example, the processor 11 is constituted of a plurality of processors.

The input device 12 is a user interface that accepts inputs to the electronic device 10 from a user. The display device 13 is a display that displays application screens, etc. to the user of the electronic device 10 under the control of the processor 11. In this embodiment, the input device 12 is a touch panel 12 having a structure integrated with the display device 13 (display). For convenience of description, it is assumed that the "touch panel 12" may refer to the input device 12 and the display device 13 in this embodiment. However, the input device 12 may be a touch pad, and accordingly the display device 13 may be a display that is separate from a touch panel.

The storage device 14 includes a main storage device and an auxiliary storage device. The main storage device is a volatile storage medium that allows high-speed reading and writing of information, and is used as a storage area and a work area when the processor 11 processes information. The auxiliary storage device stores various programs, as well as data that is used by the processor 11 when executing the programs. For example, the auxiliary storage device is a hard disk device; however, the auxiliary storage device may be a non-volatile storage or non-volatile memory of any type that is capable of storing information, which may be of the removable type. In one example, the storage device 14 is a storage device that is provided in an ordinary smartphone, which includes a volatile memory and a non-volatile memory. The storage device 14 stores various kinds of programs including a game application. For example, the storage device stores an operating system (OS), middleware, application programs, various kinds of data that may be referred to as these programs are executed, etc.

The communication device 15 is a wireless communication module that is capable of receiving data from and transmitting data to other computers, such as user terminals and servers, via a network. The communication device 15 may be a wireless communication device such as a Bluetooth (registered trademark) module, or a wired communication device such as an Ethernet module or a USB interface. In one example, the electronic device 10 downloads programs from a server by means of the communication device 15 and stores the programs in the storage device 14. In the case where data is not sent to or received from other computers, the electronic device 10 need not include the communication device 15.

Figure 2:
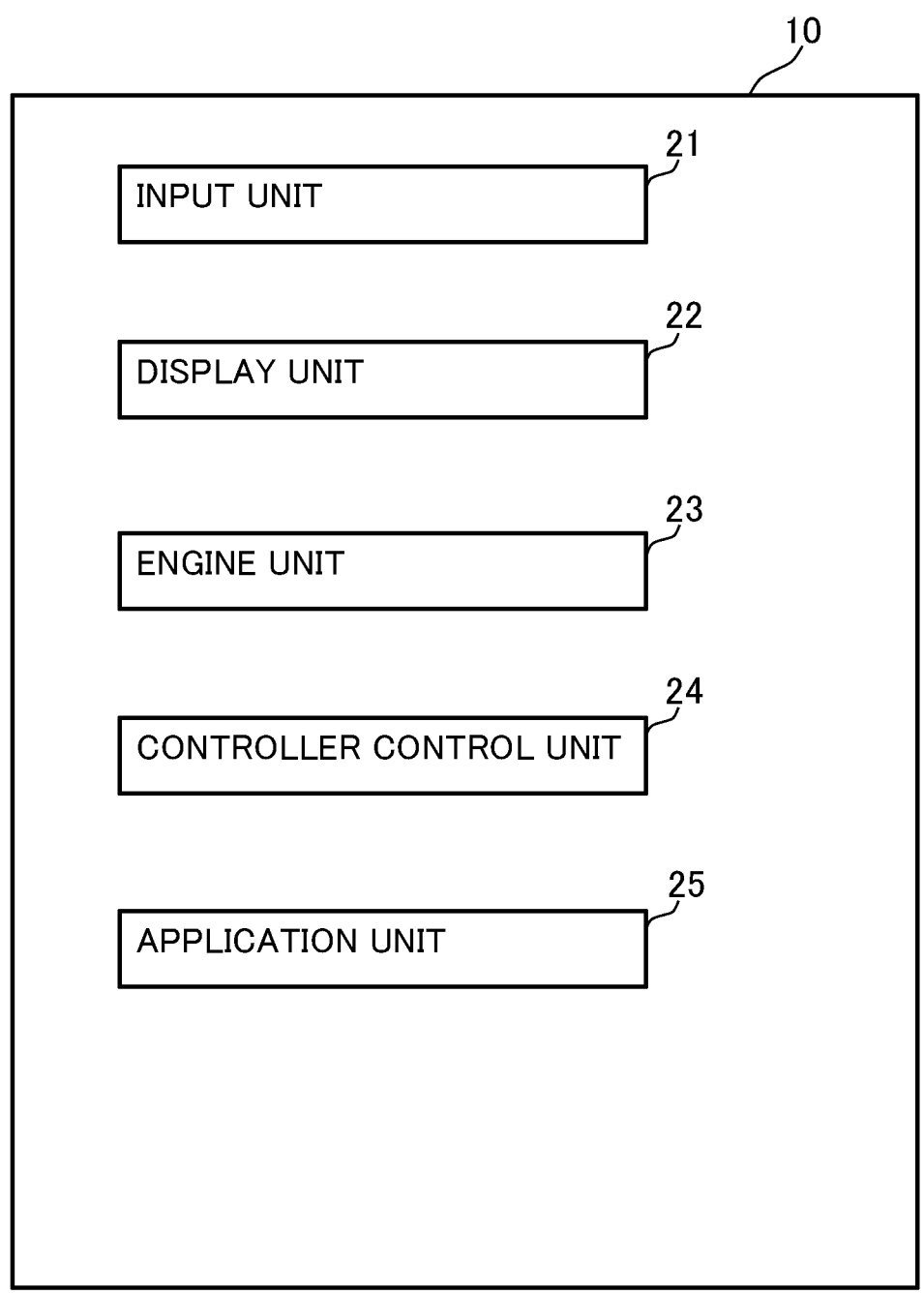
FIG. 2 is a functional block diagram of the electronic device according to the embodiment of the present invention.

FIG. 2 is a functional block diagram of the electronic device 10 according to the embodiment of the present invention. The electronic device 10 includes an input unit 21, a display unit 22, an engine unit 23, a controller control unit 24, and an application unit 25. In this embodiment, these functions are realized by the processor 11 executing programs. For example, the programs that are executed are programs stored in the storage device 14 or received via the communication device 15. Since various kinds of functions are realized by loading programs, as described above, a portion or the entirety of one part (function) may be provided in another part. The other part may be a part that is not disclosed in the context of this embodiment. Alternatively, these functions may be realized by means of hardware by configuring electronic circuits or the like for realizing the individual functions in part or in entirety. In one example, the virtual controller is realized in the form of a three-layer structure, in which the engine unit 23, the controller control unit 24, and the application unit 25 correspond to the individual layers. In this case, the virtual controller is realized by the processor 11 executing a program constituted of individual programs corresponding to the individual layers.

The input unit 21 is configured by using the touch panel 12, and accepts inputs to the electronic device 10 from the user. In this embodiment, the input unit 21 accepts touch operations performed on the touch panel 12 by the user and generates touch events. A smartphone is generally provided with the function of the input unit 21.

The display unit 22 displays a game application screen (game screen) on the touch panel 12 so as to display screens in accordance with user operations.

For each frame period (period between frames) corresponding to the frame rate, the engine unit 23 determines an angle for determining a parameter of the operable character by using a touch event generated in response to a user's touch operation on the touch panel 12. For each frame period, the engine unit 23 determines a weighted speed for determining a parameter of the operable character by using a touch event generated in response to a user's touch event on the touch panel 12. For each frame period, on the basis of the determined weighted speed and the determined angle, the controller control unit 24 determines a resultant vector for determining parameters of the operable character. For each frame period, on the basis of the determined resultant vector, the application unit 25 determines parameters of the operable character, such as a movement direction and a movement speed, and controls the actions, etc. of the operable character. The frame period F (seconds) is the period corresponding to the frame rate for executing the game. Generally, the frame rate is 30 fps (frames per second) or 60 fps. For example, F is $1/30$ seconds in the case where the frame rate is 30 fps. In one example, in each frame, for the application unit 25 to determine parameters, the engine unit 23 determines an angle and a weighted speed, and the controller control unit 24 determines a resultant vector. Note that, in this embodiment, "determining" may include calculating or calculating and determining.

The following describes holding of data points by the engine unit 23. The engine unit 23 acquires data points, indicated by values along a first axis and values along a second axis, on the basis of touch events generated in response to user operations on the touch panel 12. Here, the touch events include: touchstart, which is generated when the user places a finger in contact with the touch panel 12; touchmove, which is generated when the user moves the finger while keeping the finger in contact with the touch panel 12; and touchend, which is generated when the user removes the finger from the touch panel 12. The touch events may also include touchcancel, which is generated when a touch is cancelled.

The engine unit 23 acquires a touch event upon the generation of the touch event. When acquiring a touch event, the engine unit 23 acquires a set of numerical values (x, y) consisting of two variables and corresponding to a position at which the electrostatic capacitance on the touch panel 12 has changed, and stores the set of numerical values (x, y) in a first buffer. The data of the set of numerical values consisting of two variables is acquired by the engine unit 23 in association with the touch event, and corresponds to the data points indicated by values along the first axis and values along the second axis. Note that the first buffer is an example storage area in the storage device 14, which is prepared for temporarily holding data, and the buffer is not limited thereto as long as the buffer is capable of temporarily holding data. The same also applies to other buffers.

In one example, in addition to acquiring the set of numerical values (x, y) consisting of two variables, the engine unit 23 acquires the time t of acquisition of (x, y), and stores a set of numerical values (x, y, t) consisting of three variables in the first buffer. t is a value indicating a data-point acquisition time, which is the time of acquisition of (x, y), and is stored in the first buffer in association with (x, y), as described above. For example, t may be an integer value called the UNIX (registered trademark) time, which can be acquired from the OS, or a character sequence such as "2017/07/14 15:48:43.444". Hereinafter, holding (or termination of holding) of a data point by the engine unit 23 may include holding (or termination of holding) of a data-point acquisition time t associated with that data point.

Figure 3:
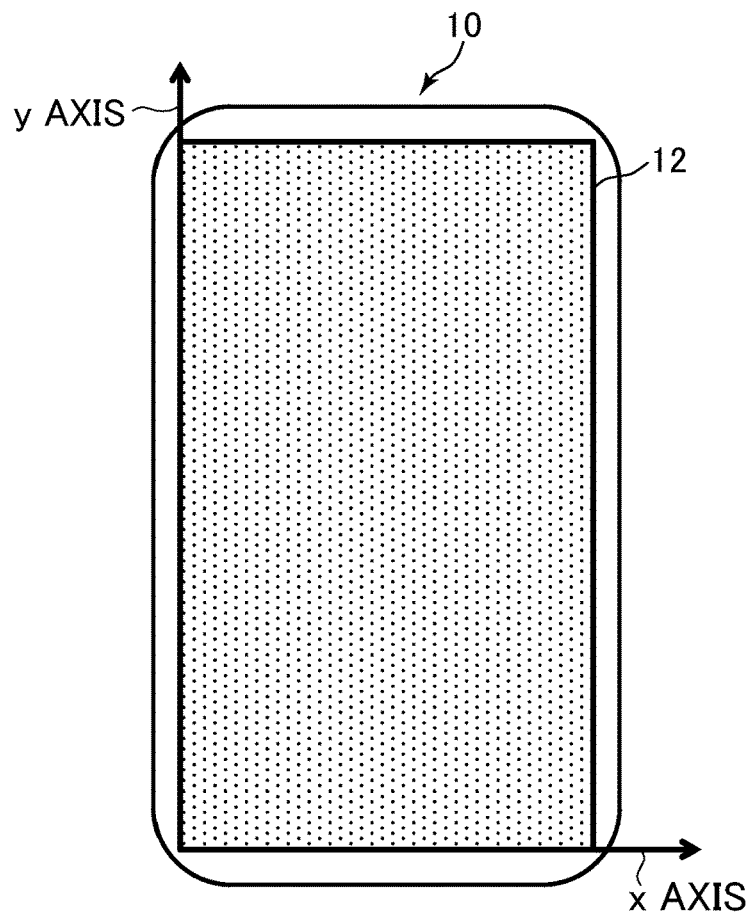
FIG. 3 is an illustration showing coordinate axes consisting of a first axis and a second axis in this embodiment.
Figure 4:
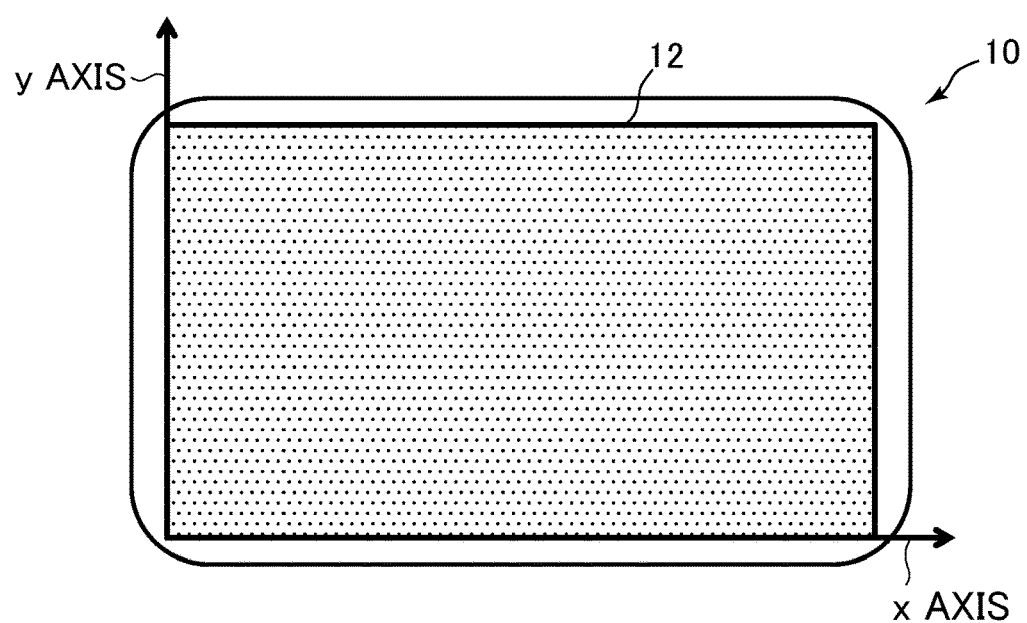
FIG. 4 is an illustration showing coordinate axes consisting of a first axis and a second axis in the embodiment of the present invention.

In this embodiment, for convenience of description, the first axis and the second axis are defined as follows. FIG. 3 is an illustration showing coordinate axes consisting of the first axis and the second axis in this embodiment. The first axis is a horizontal axis (x axis) substantially parallel to the shorter sides of the touch panel 12, which has a substantially rectangular shape. The second axis is a vertical axis (y axis) substantially parallel to the longer sides of the touch panel 12. A position on the touch panel 12 is expressed in the form of coordinates (x, y) with reference to the first axis (x axis) and the second axis (y axis). Therefore, in this embodiment, the coordinates (x, y) of a data point correspond to a position on the touch panel 12, and the engine unit 23 holds the coordinates (x, y) in the first buffer as a data point. Alternatively, as shown in FIG. 4, the first axis may be a horizontal axis (x axis) substantially parallel to the longer sides of the touch panel 12, and the second axis may be a vertical axis (y axis) substantially parallel to the shorter sides of the touch panel 12. The coordinate settings shown in FIGS. 3 and 4 are examples, and coordinates may be set differently from the above examples depending on the programs implemented in the electronic device 10.

Figure 5:
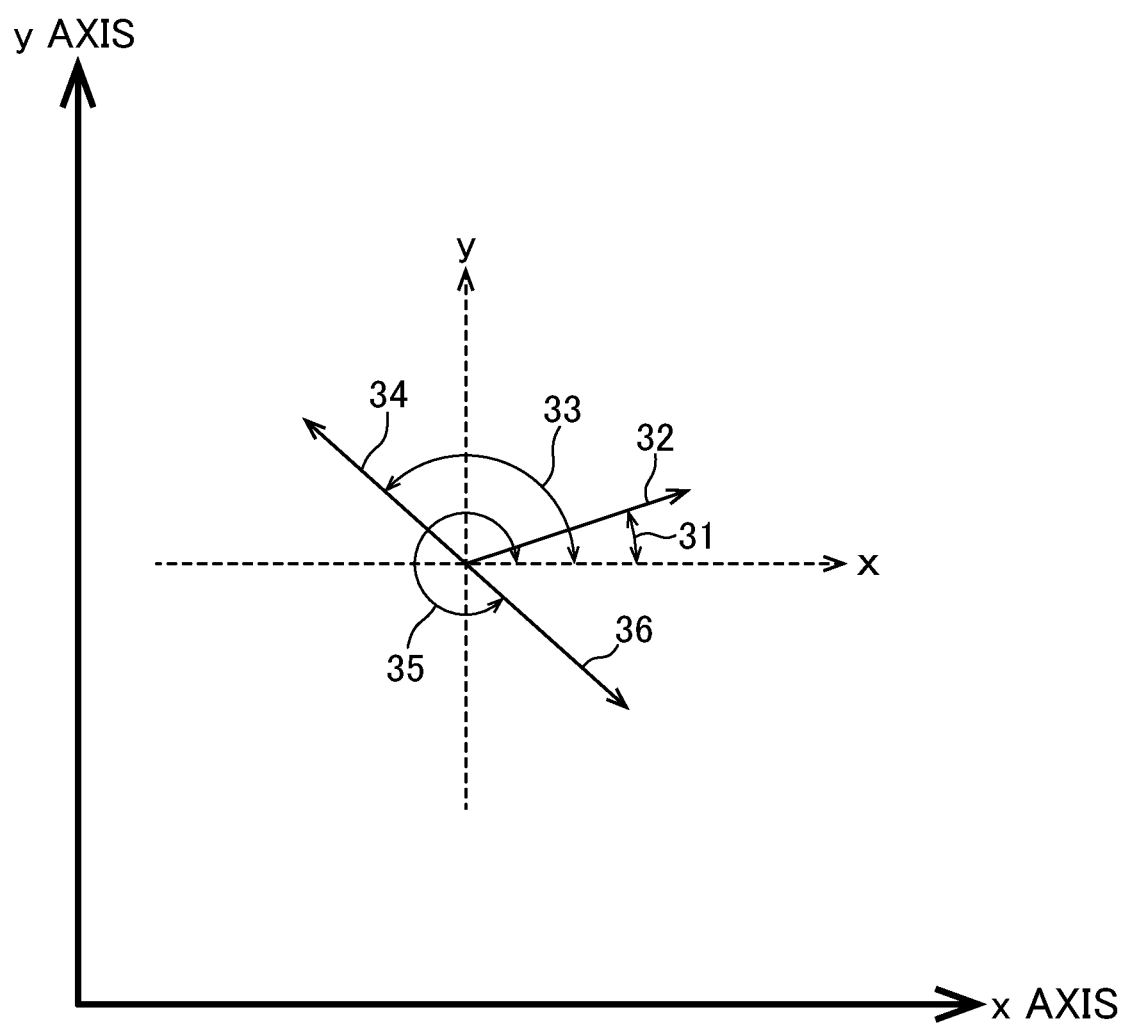
FIG. 5 is an illustration for explaining an example of an angle that is determined by an engine unit 23 and a direction corresponding to that angle in the case where coordinate axes are defined as shown in FIG. 3 or FIG. 4.

FIG. 5 is an illustration for explaining an example of an angle determined by the engine unit 23 and a direction corresponding to that angle in the case where coordinate axes are defined as shown in FIG. 3 or FIG. 4. An angle 31 in the first quadrant corresponds to a direction 32, an angle 33 in the second quadrant corresponds to a direction 34, and an angle 35 in the fourth quadrant corresponds to a direction 36. Here, although the direction 34 and the direction 36 have the same slope, the direction 34 and the direction 36 are opposite to each other, and thus it can be confirmed that the angle 33 and the angle 35 differ from each other by 180 degrees.

The engine unit 23 terminates the holding of a data point for which a predefined holding period has expired among the data points held in the first buffer. When terminating the holding of the data of a data point, for example, the engine unit 23 may delete the data, invalidate the data, or delete the data, as appropriate, by associating a flag indicating that the holding has been terminated with the data. The engine unit 23 defines a variable Da specifying, in milliseconds, the life of the data points stored in the first buffer. The period specified by the variable Da corresponds to the predefined holding period. However, the value of the variable Da is not limited to milliseconds. In one example, 167 is set in the variable Da, and the engine unit 23 holds each data point stored in the first buffer for 167 milliseconds, and terminates the holding of that data point in the first buffer after the elapse of 167 milliseconds. 167 milliseconds is an example of the period corresponding to five frames in the case where the frame rate for executing the game is 30 fps.

Figure 6:
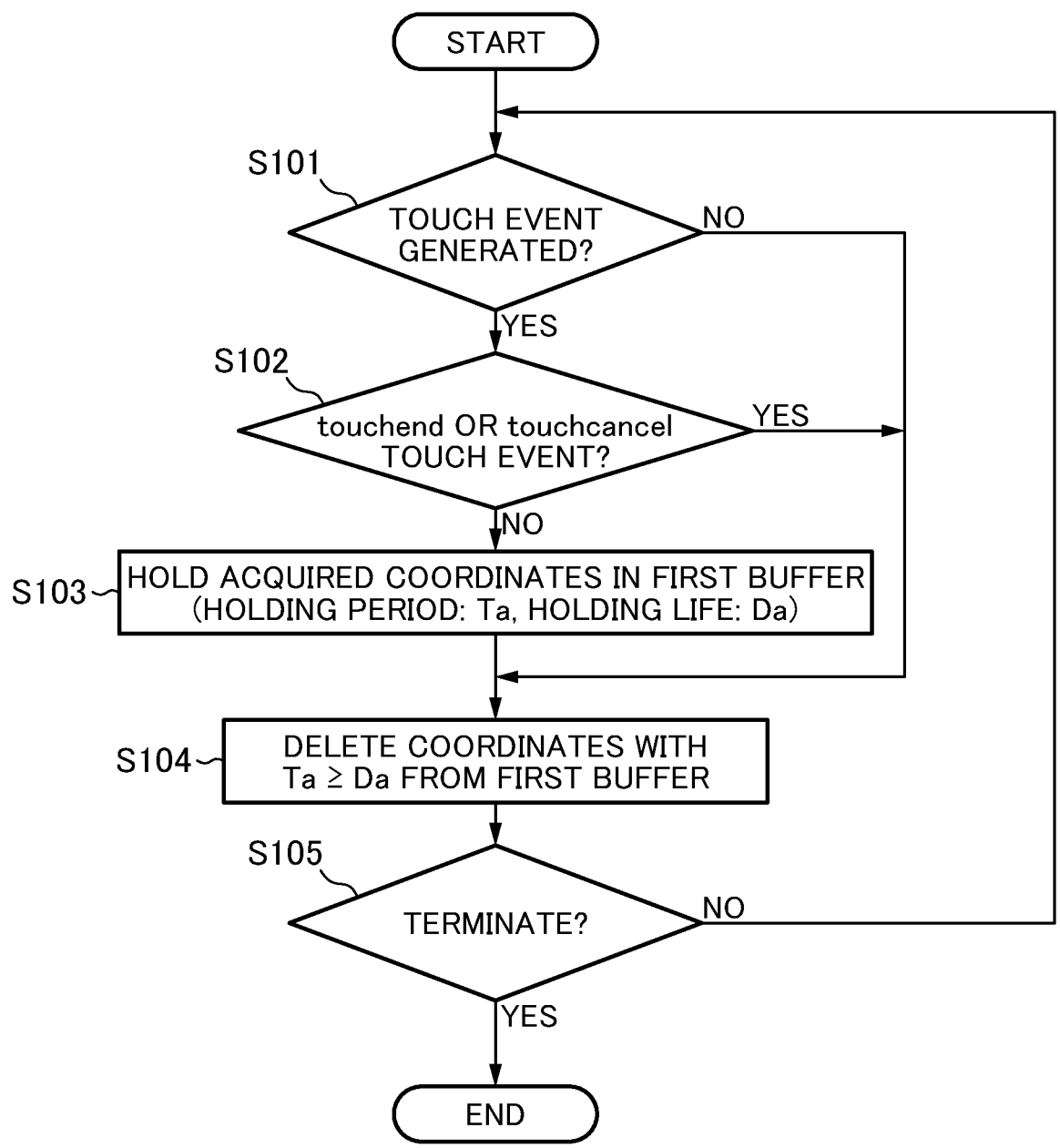
FIG. 6 is a flowchart for explaining processing for holding data points, which is executed on the electronic device according to the embodiment of the present invention.

FIG. 6 is a flowchart for explaining processing for holding data points, which is executed on the electronic device 10 according to the embodiment of the present invention.

In step 101, the engine unit 23 determines whether or not a touch event has been generated. The flowchart proceeds to step 102 in the case where a touch event has been generated, and the flowchart proceeds to step 104 in the case where a touch event has not been generated.

In step 102, the engine unit 23 determines whether or not the generated touch event is touchend or touchcancel. The flowchart proceeds to step 103 in the case where the acquired touch event is neither touchend nor touchcancel. The flowchart proceeds to step 104 in the case where the acquired touch event is either touchend or touchcancel.

In step 103, the engine unit 23 acquires data points from the generated touch event and stores the data points in the first buffer. In one example, the engine unit 23 associates, with the data points that are stored, Ta indicating the time elapsed after storage in milliseconds and a variable Da indicating the allowable period of storage in the first buffer in milliseconds.

In step 104, the engine unit 23 terminates holding of the data points with which the elapsed time Ta is greater than or equal to the variable Da among the data points held in the first buffer. In one example, the engine unit 23 compares the elapsed time Ta with the variable Da for each of the data points stored in the first buffer, and terminates holding of that data point in the case where the elapsed time Ta is greater than or equal to the variable Da.

The flowchart returns to step 101 unless the flowchart comes to an end in step 105, for example, due to closing of the game application.

Determination of a weighted speed by the engine unit 23 will be described. As the method of determining a weighted speed by the engine unit 23, for example, it is possible to use the same method as the method of determining a weighted speed by an engine unit, disclosed in the Publication of Japanese Patent No. 6560801.

For each frame period, the engine unit 23 holds one or more data points held in the first buffer in a second buffer in the storage device 14 as a data point sequence. Alternatively, for each frame period, without the intervention of the first buffer, the engine unit 23 holds one or more data points, acquired on the basis of a touch event generated in response to a user operation on the touch panel 12, in the second buffer as a data point sequence.

The data point sequence P(i), held by the engine unit 23 in the i-th frame, is expressed as follows.

$$P(i)=\{P_{i,1}, P_{i,2}, \ldots P_{i,m}\}$$

$P_{i,k}$ (k=1 to m) signifies each data point. Each data point included in the data point sequence P(i) is a data point held in the first buffer during the i-th frame period. The x coordinate value and the y coordinate value of each data point $P_{i,k}$ (k=1 to m) are expressed by $(x_{i,k}, y_{i,k})$. It is assumed that the order of storage of the data points in the first buffer, in order from earlier to later, is $P_{i,1}$, $P_{i,2}$, ..., and $P_{i,m}$. The engine unit 23 holds P(i) after the elapse of the period F (seconds) of one frame since holding the (i−1)-th P(i−1), and holds P(i+1) after the elapse of the period of another frame. The variable m, which represents the number of data points included in P(i), varies depending on P(i).

The engine unit 23 terminates the holding of a data point sequence for which a predefined holding period has expired among the data point sequences held in the second buffer. When terminating the holding of the data of a data point sequence, for example, the engine unit 23 may delete the data, invalidate the data, or delete the data, as appropriate, by associating a flag indicating that the holding has been terminated with the data. The engine unit 23 defines a variable Db specifying the life of the data points stored in the second buffer. The period specified by the variable Db corresponds to the predefined holding period, which corresponds to the frame period in this embodiment. For example, the engine unit 23 holds a data point sequence P(i) in the second buffer in association with the time $t_i$ at which the data point sequence P(i) was held. After storing one data point sequence P(i) in the second buffer, the engine unit 23 monitors the elapsed time Tb since the storage of that data point sequence P(i) and continually compares the elapsed time Tb with the variable Db. For example, the engine unit 23 calculates the elapsed time Tb by using the time $t_i$ that was held. The engine unit 23 terminates the holding of the monitored data point sequence P(i) in the second buffer when the elapsed time Tb of that data point sequence P(i) has exceeded the variable Db.

In this embodiment, the engine unit 23 holds one data point sequence P(i) in the second buffer for a period 5F corresponding to five frames (seconds). Therefore, the engine unit 23 holds five data point sequences. The engine unit 23 holds five data point sequences in order of P(5), P(4), P(3), P(2), and P(1) from newer to older data point sequences. Therefore, in the case where the engine unit 23 holds data point sequences corresponding to five frames, P(5) is the most recent data point sequence that is held. In the case where the engine unit 23 newly holds a data point sequence, the engine unit 23 holds the new data point sequence as P(5), and substitutes the data of P(i+1) for P(i) (1≤i≤4). At this time, the engine unit 23 terminates the holding of P(1), for which the predefined holding period has expired.

A data point sequence may represent a sequence of data points or a matrix of data points. In one preferred example, for each frame period, the engine unit 23 holds x coordinate values and y coordinate values separately as data point sequences. A set X of x coordinate values and a set Y of y coordinate values, held by the engine unit 23, are expressed by Eqs. (1) and (2), respectively.

$$X = \begin{bmatrix} x_{1,1} & \cdots & x_{n,1} \\ \vdots & \ddots & \vdots \\ x_{1,m} & \cdots & x_{n,m} \end{bmatrix} \quad (1)$$

$$Y = \begin{bmatrix} y_{1,1} & \cdots & y_{n,1} \\ \vdots & \ddots & \vdots \\ y_{1,m} & \cdots & y_{n,m} \end{bmatrix} \quad (2)$$

Here, n signifies the number of data point sequences that the engine unit 23 holds in the second buffer, which corresponds to the number of frames. In this embodiment, since the engine unit 23 holds data point sequences for the period 5F (seconds) corresponding to five frames, n changes in the following manner as the time elapses: n=1, n=2, n=3, n=4, n=5, . . . n=5. Therefore, n=5 after the elapse of the period 5F (seconds) corresponding to five frames. Furthermore, the x coordinate values of the most recently held data point sequence P(n) are $x_{n,1}, \ldots x_{n,m}$, and the y coordinate values of the most recently held data point sequence P(n) are $y_{n,1}, \ldots y_{n,m}$. Note that the maximum value of n varies depending on the period for which the engine unit 23 holds each data point sequence.

For each frame period, the engine unit 23 determines a displacement speed in the data point sequences held in the second buffer on the basis of data point displacements in those data point sequences. The engine unit 23 determines a weighted speed at least on the basis of the variation (deviation) of the most recently determined displacement speed from the average of the precedingly determined displacement speeds. In one example, the engine unit 23 holds the value of the determined weighted speed in a prescribed storage area in the storage device 14, which can be referred to by other functional units and programs.

The displacement speed corresponds to the speed of displacement of data points (positions at which touch events were generated) during the period of the frame being considered. Alternatively, it can be said that the displacement speed is a speed corresponding to the movement speed of a user's finger, calculated from the set of data points (positions at which touch events were generated) in the period of the frame being considered. The displacement speed $v_i$ is the displacement speed in the i-th data point sequence or the displacement speed in the i-th frame.

In one example, the engine unit 23 determines a weighted speed on the basis of the variation of the displacement speed $v_n$ in the most recent data point sequence, among the held data point sequences, with respect to the average of the displacement speeds $v_1$ to $v_{n-1}$ in the data point sequences held before the most recent data point sequence. In one example, the engine unit 23 determines a weighted speed on the basis of the variation of the displacement speed $v_i$ (i=1 to n) in one data point sequence, among the held data point sequences, with respect to the average of the displacement speeds $v_1$ to $v_{i-1}$ in the data point sequences held before the one data point sequence. Here, for example, the variation of the displacement speed $v_i$ with respect to the average of the displacement speeds $v_1$ to $v_{i-1}$ is the variation (deviation) of the displacement speed $v_i$ from the average of the displacement speeds $v_1$ to $v_{i-1}$. Note that the average of the displacement speeds $v_1$ to $v_{i-1}$ is considered to be 0 in the case where i=1 and is considered to be $v_1$ in the case where i=2.

In one example, the engine unit 23 calculates an output value of a cumulative pointwise deviation function (CPD function) defined in Eq. (3), and determines the output value as a weighted speed.

$$CPD(x, y) = \sqrt{\frac{1}{n}\sum_{i=1}^{n}(v_i - avg_{i-1}(V))^2} \quad (3)$$

Here, n signifies the number of data point sequences held in the second buffer by the engine unit 23.

In one example, in the case where the engine unit 23 holds x coordinate values and y coordinate values separately as data point sequences, the engine unit 23 determines a displacement speed on the basis of displacements among the x coordinate values and displacements among the y coordinate values in the data point sequences held in the second buffer. In one example, the engine unit 23 determines a displacement speed on the basis of the amounts of displacement between temporally adjacent data points in the data point sequences held in the second buffer, as well as the numbers of data points included in the data point sequences. In the above example, the engine unit 23 determines a displacement speed further on the basis of a weight coefficient.

In one example, the engine unit 23 calculates the displacement speed $v_i$ by using equation (4).

$$v_i = \frac{\alpha}{m-1}\sum_{j=1}^{m-1}\left(\beta\sqrt{(x_{i,j} - x_{i,j+1})^2 + (y_{i,j} - y_{i,j+1})^2}\right) \quad (4)$$

Here, α signifies a coefficient corresponding to the pixel density DPI (dots per inch) of the display. α is a real number greater than or equal to 0, and is generally 1. β is a weight coefficient. It becomes easier for abrupt changes to be reflected in displacement speeds as β is increased, and it becomes more difficult for abrupt changes to be reflected in displacement speeds as β is decreased. In the case where P(i) includes no data point, the engine unit 23 does not calculate the displacement speed $v_i$, and sets, for example, $v_i=0$. Also in the case where P(i) includes only one data point, similarly, the engine unit 23 does not calculate the displacement speed $v_i$, and sets, for example, $v_i=0$.

As expressed in Eq. (4), the engine unit 23 determines the displacement speed $v_i$ further on the basis of the weight coefficient β. The engine unit 23 uses the weight coefficient β not as a static value but as a dynamic value corresponding to an angle that is determined by the engine unit 23 for each frame period. The engine unit 23 calculates the weight coefficient β according to the components along the x axis direction and the y axis direction in the direction indicated by the angle determined by the engine unit 23 in the period of the frame being considered. In one example, the engine unit 23 calculates the weight coefficient β by using Eq. (5).

$$\beta = \frac{\sqrt{(a^2(\sin\theta)^2 + b^2(\cos\theta)^2)}}{\max(a, b)} \quad (5)$$

Here, a and b are values indicating magnitudes corresponding to the lengths of the minor axis (x axis) and the major axis (y axis) or the major axis (x axis) and the minor axis (y axis) of a virtual ellipse having two axes on the x axis and the y axis preset on the coordinate axes. The values a and b have different magnitudes. θ signifies an angle that is determined by the engine unit 23 for each frame period, and max(a, b) is a function that outputs the maximum value of a and b. According to Eq. (5), the weight coefficient β gives a weight corresponding to the inverse of the magnitude of the radius at the angle θ of an ellipse having a and b as the lengths along the individual axes.

Figure 7:
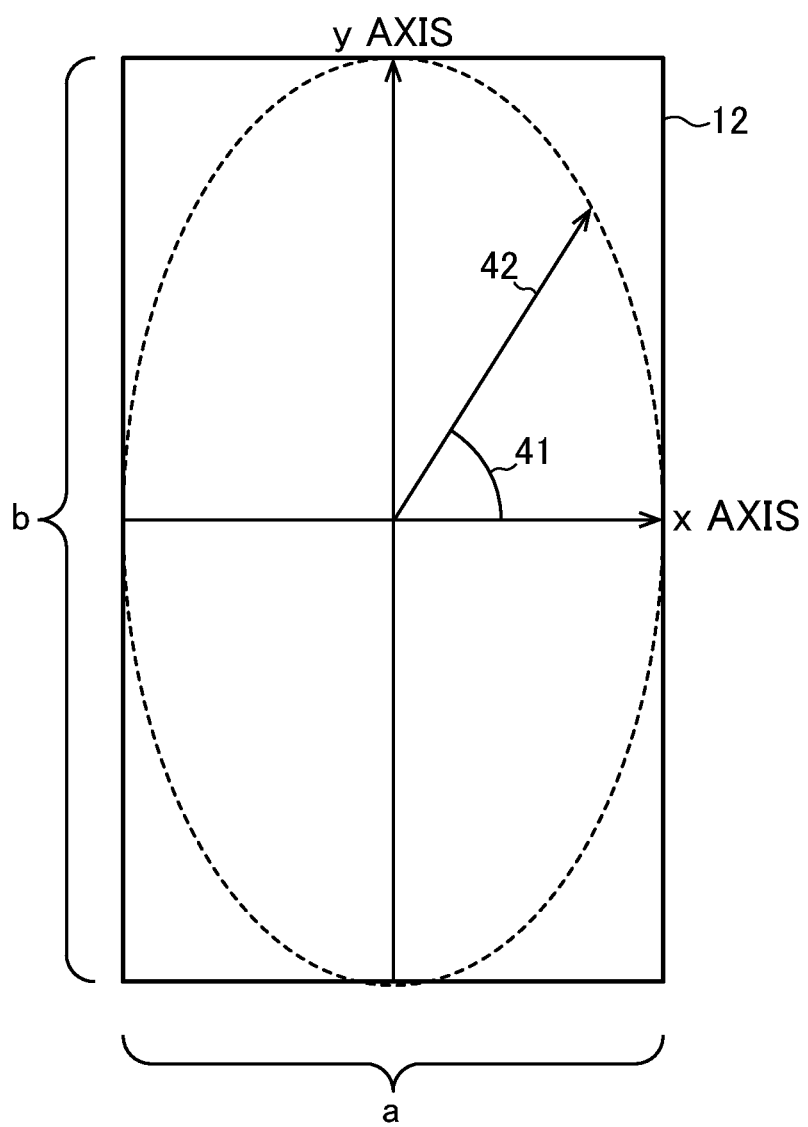
FIG. 7 is an example schematic illustration for explaining a weight coefficient β.

FIG. 7 is an example schematic illustration for explaining the weight coefficient β. a and b indicate the ratio of the length of the x axis and the length of the y axis of the touch panel 12, an angle 41 is an angle corresponding to θ in Eq. (5), and a vector 42 is a vector extending from the center to the elliptic circumference of an ellipse having a and b as the lengths of the individual axes. The weight coefficient β is a weight coefficient for giving a weight corresponding to the inverse of the magnitude of the vector 42, and the value thereof changes in an elliptic manner according to the angle 41. As shown in FIG. 7, assuming a<b, the denominator in Eq. (5) becomes b, and the range of values that β can take on is a/b≤β≤1. β takes on the maximum value β=1 in the case where θ=0° or 180°, and β takes on the minimum value β=a/b in the case where θ=90° or 270°. Therefore, in the case where the direction indicated by the angle determined by the engine unit 23 is an input along the minor axis direction, the weight coefficient β becomes greater, and the displacement speed $v_i$ also becomes greater. Meanwhile, in the case where the direction indicated by the angle determined by the engine unit 23 is an input along the major axis direction, the weight coefficient β becomes smaller, and the displacement speed $v_i$ also becomes smaller. With this configuration, it becomes possible to make it easier to perform acceleration along the minor axis direction of the ellipse, while making it difficult to perform acceleration along the major axis direction of the ellipse.

Although the lengths of the two axes (major axis and minor axis) of a virtual ellipse have values corresponding to the lengths of the touch panel 12 in the above example, there is no limitation to such values. a and b correspond to the lengths of the two axes of a virtual ellipse having two axes that are individually parallel to the x axis and the y axis; for example, the values of a and b may be chosen arbitrarily depending on the design of the virtual controller. Furthermore, since max(a, b) gives a constant a or b, for example, arbitrary values may be chosen depending on the design of the virtual controller.

$avg_{i-1}(v)$ signifies the average of the displacement speeds $v_i$ up to immediately before the i-th frame. $avg_{i-1}(v)$ is calculated according to Eq. (6).

$$\text{avg}_{i-1}(V) = \begin{cases} \frac{1}{i-1}\sum_{j=1}^{i-1} v_j, & i-1 > 0 \\ 0, & i-1 = 0 \end{cases} \quad (6)$$

Here, in the case where i=1, since there are no displacement speeds up to immediately before, $avg_{i-1}(v)=0$.

Figure 8:
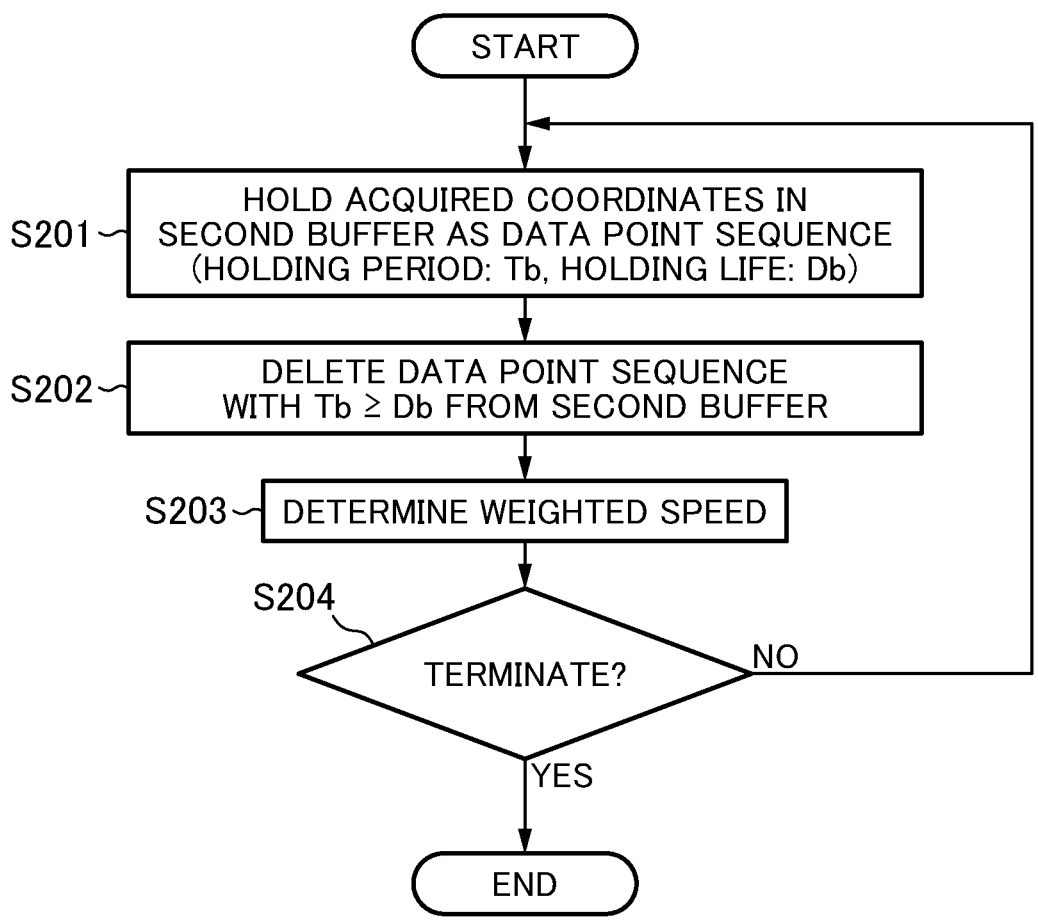
FIG. 8 is a flowchart for explaining processing for determining a weighted speed, which is executed on the electronic device according to the embodiment of the present invention.

FIG. 8 is a flowchart for explaining processing for determining a weighted speed, which is executed on the electronic device 10 according to the embodiment of the present invention. In one example, the electronic device 10 executes steps 201 to 204 in this flowchart for each period corresponding to the frame rate.

In step 201, the engine unit 23 holds data points acquired during one frame in the second buffer as a data point sequence P(i). At this time, the engine unit 23 associates, with the data point sequence P(i) that is held, Tb indicating the time elapsed after storage in milliseconds and a variable Db indicating the allowable period of storage (holding life) in the second buffer in milliseconds.

Then, in step 202, the engine unit 23 terminates the holding of a data point sequence P(i) with which the elapsed time Tb is greater than or equal to the variable Db among the data point sequences P(i) held in the second buffer.

Then, in step 203, the engine unit 23 determines a weighted speed by using Eqs. (3) to (6).

Then, in step 204, the flowchart returns to step 201 unless the flowchart comes to an end, for example, due to closing of the game application. When the flowchart comes to an end, the engine unit 23 terminates the holding of all the data point sequences P(i).

Determination of an angle by the engine unit 23 will be described. As the method of angle determination by the engine unit 23, for example, it is possible to use the same method as the method of angle determination by an angle determination unit disclosed in the Publication of Japanese Patent No. 6389581. The engine unit 23 determines an angle indicated by a set of data points expressed in the form of values along the first axis and values along the second axis, acquired on the basis of touch events generated by user operations on the touch panel, on the basis of those data points.

For each frame period, the engine unit 23 determines whether or not it is possible to calculate an angle. In the case where it is possible to calculate an angle, the engine unit 23, by using the data points held in the first buffer, calculates an angle indicated by the set of data points. By obtaining the angle indicated by the set of data points, it becomes possible for the engine unit 23 to obtain the angle of the direction intended by the user who has performed a touch operation on the touch panel 12. In one example, the engine unit 23 defines a variable B, and in the case where the number of data points held in the first buffer is greater than or equal to the variable B, the engine unit 23 calculates (determines) an angle by using the data points and holds the determined angle. In this case, the engine unit 23 holds only the most recently determined angle. In the case where the number of data points held in the first buffer is less than the variable B, the engine unit 23 determines the angle that is held, without calculating an angle. Since it is generally desired that three or more data points are available in obtaining the slope of the regression line, the variable B should preferably set to be 3 or greater.

The engine unit 23 determines the slope of the regression line on the basis of the data points held in the first buffer. In determining the slope of the regression line, the engine unit 23 determines one of the x axis and the y axis as the axis of the independent variable on the basis of the amounts of displacement of the values along the x axis and the amounts of displacement of the values along the y axis in the data points held in the first buffer. The engine unit 23 determines the other axis as the axis of the dependent variable. In one example, the engine unit 23 calculates the slope of the regression line by using the method of least squares.

The engine unit 23 determines the slope a of a regression line y=ax+b when the x axis is considered as the axis of the independent variable, while determining the slope c of a regression line x=cy+d when the y axis is considered as the axis of the independent variable.

In one example, the engine unit 23 determines one of the x axis and the y axis as the axis of the independent variable on the basis of the difference between the maximum value and the minimum value among the values along the x axis and the difference between the maximum value and the minimum value among the values along the y axis in the data points held in the first buffer, while determining the other axis as the axis of the dependent variable. In one example, the engine unit 23 determines one of the x axis and the y axis as the axis of the independent variable on the basis of a weighted value obtained by applying a weight coefficient to the difference between the maximum value and the minimum value among the values along the x axis, as well as the difference between the maximum value and the minimum value among the values along the y axis, in the data points held in the first buffer, while determining the other axis as the axis of the dependent variable.

Since the calculated slope of the regression line does not have a positive or negative direction, when calculating the slope of the regression line by using the method of least squares, the engine 23 calculates the slope, for example, within the range of 0 to 90 degrees and 270 to 360 degrees. Thus, for example, whether the angle indicated by the set of data points is 45 degrees or 225 degrees, the slope of the regression line is calculated to be 45 degrees. Thus, after determining the slope of the regression line, on the basis of the displacement direction of the set of data points, the engine unit 23 determines the amount of rotation indicating whether or not the determined slope (angle) of the regression line is to be rotated by 180°. In one example, the engine unit 23 determines the amount of rotation by comparing the number of positive differences and the number of negative differences between data points temporally preceding and succeeding each other among the values along the determined axis of the independent variable. Here, the displacement direction of the set of data points indicates a direction in which the data points become displaced with time, and corresponds, for example, to a rough direction in which the user moves a finger on the touch panel 12.

In one example, the engine unit 23 determines an angle by using an aop(x, y) function expressed in Eq. (7). The function aop(x, y) calculates an angle in the form of a real value in the range of 0 to 360 degrees. It is assumed that the first buffer is holding n data points P when the engine unit 23 calculates an angle by using the function aop(x, y). Furthermore, the value of the x coordinate and the value of the y coordinate of each of the n data points $P_k$ (k=1 to n) are expressed by $(x_k, y_k)$, and it is assumed that the order of storage of $P_k$ in the first buffer, in order from earlier to later, is $P_1, P_2, \ldots, —, $ and $P_n$.

$$aop(x, y) = \begin{cases} 180\dfrac{\operatorname{atan}\left(\dfrac{\sum_{i=1}^n (x_i - \bar{x})(y_i - \bar{y})}{\sum_{i=1}^n (x_i - \bar{x})^2}\right)}{\pi}, & \neg \operatorname{rotate}(x, y) \wedge \neg \operatorname{left}(x) \\ -180\dfrac{\operatorname{atan}\left(\dfrac{\sum_{i=1}^n (x_i - \bar{x})(y_i - \bar{y})}{\sum_{i=1}^n (y_i - \bar{y})^2}\right)}{\pi} + 90, & \operatorname{rotate}(x, y) \wedge \neg \operatorname{down}(y) \\ -180\dfrac{\operatorname{atan}\left(\dfrac{\sum_{i=1}^n (x_i - \bar{x})(y_i - \bar{y})}{\sum_{i=1}^n (y_i - \bar{y})^2}\right)}{\pi} + 270, & \operatorname{rotate}(x, y) \wedge \operatorname{down}(y) \\ 180\dfrac{\operatorname{atan}\left(\dfrac{\sum_{i=1}^n (x_i - \bar{x})(y_i - \bar{y})}{\sum_{i=1}^n (x_i - \bar{x})^2}\right)}{\pi} + 180, & \neg \operatorname{rotate}(x, y) \wedge \operatorname{left}(x) \end{cases} \quad (7)$$

For the purpose of case classification, the function aop(x, y) uses a function rotate(x, y), a function left(x), and a function down(y). First, the function aop(x, y) determines either x or y as an independent variable by using the function rotate(x, y).

The function rotate(x, y) is defined by Eq. (8).

$$\operatorname{rotate}(x,y) = w \cdot (\max(x) - \min(x)) < (\max(y) - \min(y)) \quad (8)$$

The function rotate(x, y) determines whether or not the n data points P are displaced mainly in the y axis direction, and returns, for example, a true or false value. In this manner, the function rotate(x, y) determines whether the n data points P are displaced mainly in the x axis (horizontal) direction or mainly in the y axis (vertical) direction, thereby determining which of the value along the x axis and the value along the y axis is suitable as an independent variable.

In Eq. (8), (max(x)−min(x)) signifies the absolute value of the difference between the maximum value and the minimum value among the x values $(x_1, x_2, \ldots x_n)$ of the n data points P, which indicates the amount of displacement of the n data points P in the x axis direction. Similarly, (max(y)−min(y)) signifies the absolute value of the difference between the maximum value and the minimum value among the y values $(y_1, y_2, \ldots y_n)$ of the n data points P, which indicates the amount of displacement of the n data points P in the y axis direction. A variable w is a weight coefficient for applying a weight to (max (x)−min(x)).

The function rotate(x, y) satisfies the inequality when (max(y)−min(y)) is greater than the product of (max(x)−min(x)) and the variable w, in which case the function aop(x, y) performs coordinate transformation. In this case, the function aop(x, y) considers the y axis as the axis of the independent variable and the x axis as the axis of the dependent variable, and determines the amount of rotation by further using the function down(y). Meanwhile, the function rotate(x, y) does not satisfy the inequality when (max(y)−min(y)) is less than or equal to the product of (max(x)−min(x)) and the variable w, in which case the function aop(x, y) does not perform coordinate transformation. In this case, the function aop(x, y) considers the x axis as the axis of the independent variable and the y axis as the axis of the dependent variable, and determines the amount of rotation by further using the function left(x). The variable w is set to be, for example, 0.5 or 2 depending on the dimensions along the x axis direction and the y axis direction, as well as how the smartphone is held by the user.

The function left(x) is expressed by Eq. (9).

$$\text{left}(x) = |\{x'|x'_i > 0\}| < |\{x'|x'_i < 0\}|, x' \leftarrow [x_2 - x_1, x_3 - x_2, \ldots, x_n - x_{n-1}] \quad (9)$$

In the case where the function rotate(x, y) does not satisfy the inequality, the function left(x) determines whether or not the displacement direction of the n data points P is the −x axis direction (leftward direction), and returns, for example, a true or false value. The function left(x) calculates the differences $(x_2-x_1, x_3-x_2, \ldots x_n-x_{n-1})$ between values temporally preceding and succeeding each other among the x values $(x_1, x_2, \ldots x_n)$ of the n data points P. The function left(x) determines whether or not the displacement direction of the n data points P is the −x axis direction (leftward direction) by determining whether or not the number of negative differences is greater than the number of positive differences. In this manner, the function left(x) determines whether the displacement direction of the n data points P is the −x axis direction (leftward direction) or the +x axis direction (rightward direction), thereby determining the amount of rotation indicating whether or not the determined slope of the regression line is to be rotated by 180 degrees. For example, the function aop(x, y) determines the amount of rotation to be 180 degrees in the case where the function left(x) is true, and the function aop(x, y) determines the amount of rotation to be 0 degrees in the case where the function left(x) is false.

The function down(y) is expressed by Eq. (10).

$$\text{down}(y) = |\{y'|y'_i > 0\}| < |\{y'|y'_i < 0\}|, y' \leftarrow [y_2 - y_1, y_3 - y_2, \ldots, y_n - y_{n-1}] \quad (10)$$

In the case where the function rotate(x, y) satisfies the inequality, the function down(y) determines whether or not the displacement direction of the n data points P is the −y axis direction (downward direction), and returns, for example, a true or false value. The function down(y) calculates the differences $(y_2-y_1, y_3-y_2, \ldots y_n-y_{n-1})$ between values temporally preceding and succeeding each other among the y values $(y_1, y_2, \ldots y_n)$ of the n data points P. The function down(y) determines whether or not the displacement direction of the n data points P is the −y axis direction (downward direction) by determining whether or not the number of negative differences is greater than the number of positive differences. In this manner, the function down(y) determines whether the displacement direction of the n data points P is the −y axis direction (downward direction) or the +y axis direction (upward direction), thereby determining the amount of rotation indicating whether or not the determined slope of the regression line is to be rotated by 180 degrees. For example, the function aop(x, y) determines the amount of rotation to be 180 degrees in the case where the function down(y) is true, and the function aop(x, y) determines the amount of rotation to be 0 degrees in the case where the function down(y) is false.

After determining the independent variable (the axis of the independent variable) and the amount of rotation in the manner described above, the function aop(x, y) calculates the slope by using the method of least squares. For example, in the case where x is considered as the independent variable and y is considered as the dependent variable, the function aop(x, y) calculates the slope a of the regression line y=ax+b according to Eq. (11).

$$a = \frac{\sum_{i=1}^{n}(x_i - \bar{x})(y_i - \bar{y})}{\sum_{i=1}^{n}(x_i - \bar{x})^2} \quad (11)$$

Here, $$\bar{x}$$

signifies the average of x (independent variable), $$\bar{y}$$

signifies the average of y (dependent variable), $$\sum_{i=1}^{n}(x_i - \bar{x})(y_i - \bar{y})$$

signifies the covariance of x (independent variable) and y (dependent variable), and $$\sum_{i=1}^{n}(x_i - \bar{x})^2$$

signifies the variance of x (independent variable).

Similarly, in the case where y is considered as the independent variable and x is considered as the dependent variable, the function aop(x, y) calculates the slope c of the regression line x=cy+d according to Eq. (12).

$$c = \frac{\sum_{i=1}^{n}(x_i - \bar{x})(y_i - \bar{y})}{\sum_{i=1}^{n}(y_i - \bar{y})^2} \quad (12)$$

In the case where the function rotate(x, y) is false and the function left(x) is false, the function aop(x, y) directly calculates an angle obtained from the slope of the regression line. In the case where the function rotate(x, y) is false and the function left(x) is true, the function aop(x, y) calculates an angle obtained by adding 180 degrees to an angle obtained from the slope of the regression line. In the case where the function rotate(x, y) is true and the function down(y) is false, the function aop(x, y) calculates an angle by subtracting an angle obtained from the slope of the regression line from 90 degrees. In the case where the function rotate(x, y) is true and the function down(y) is true, the function aop(x, y) calculates an angle by adding 180 degrees to an angle obtained by subtracting an angle obtained from the slope of the regression line from 90 degrees.

In one example, the engine unit 23 holds the value of the determined angle in a prescribed storage area in the storage device 14, which can be referred to by other functional units and programs, unless touchend or touchcancel is generated. In this embodiment, the engine unit 23 holds only the most recent determined angle.

Figure 9:
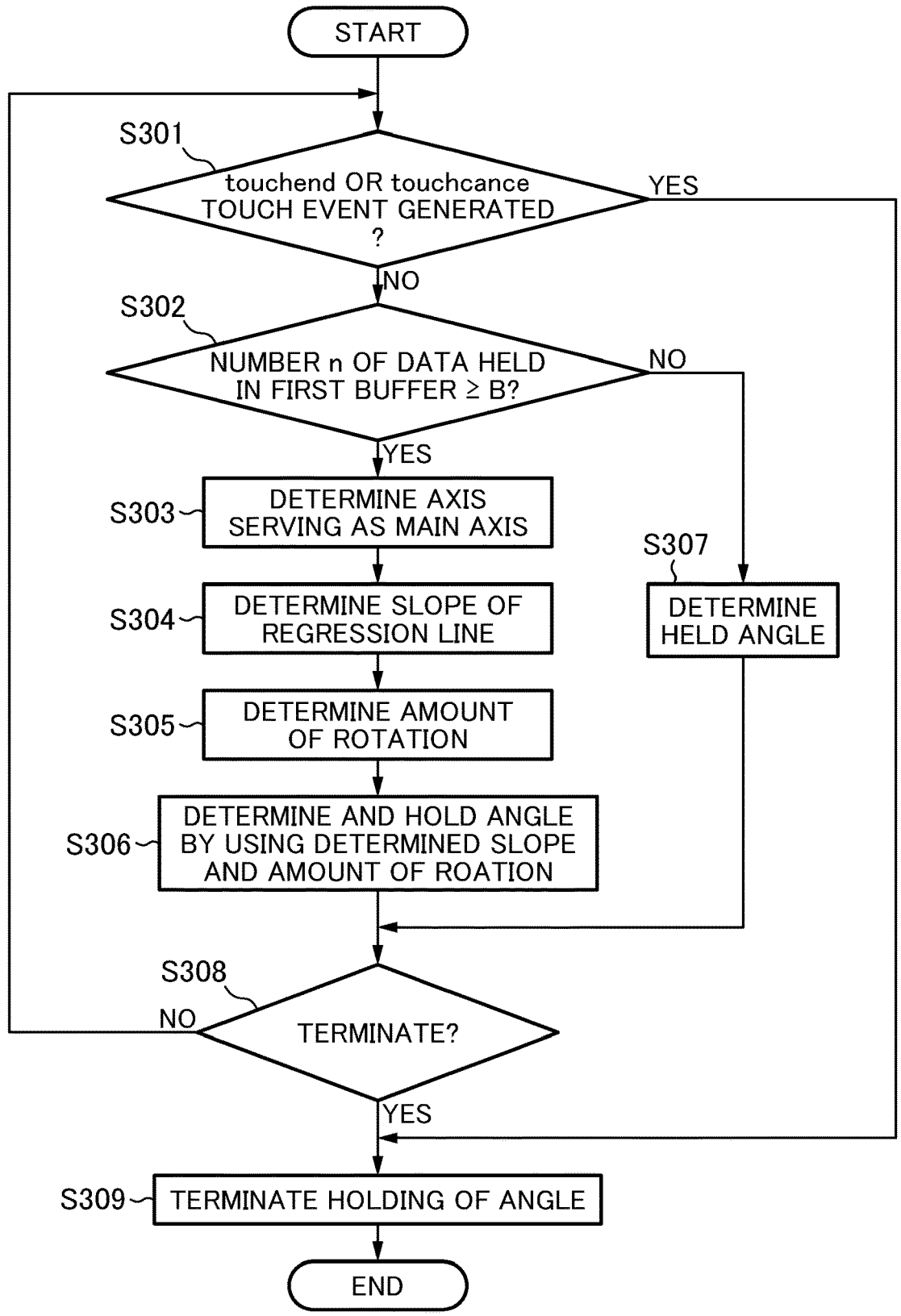
FIG. 9 is a flowchart for explaining processing for determining an angle, which is executed on the electronic device according to the embodiment of the present invention.

FIG. 9 is a flowchart for explaining processing for determining an angle, which is executed on the electronic device 10 according to the embodiment of the present invention. In one example, the electronic device 10 executes steps 301 to 309 in this flowchart for each frame period corresponding to the frame rate.

In step 301, the engine unit 23 determines whether or not a touchend or touchcancel touch event has been generated. In one example, the engine unit 23 determines whether or not such a touch event has been generated during one frame. In the case where neither touchend nor touchcancel has been generated, the flowchart proceeds to step 302. In the case where touchend or touchcancel has been generated, the flowchart proceeds to step 309.

In step 302, the engine unit 23 determines whether or not the number n of data points held in the first buffer is greater than or equal to the value of the variable B. The flowchart proceeds to step 303 in the case where the number n is greater than or equal to the variable B, and the flowchart proceeds to step 307 in the case where the number n is less than the variable B.

In step 303, the engine unit 23 determines one of the x axis and the y axis as the axis of the independent variable on the basis of the amounts of displacement of the values along the x axis and the amounts of displacement of the values along the y axis among the data points held in the first buffer. At the same time, the engine unit 23 determines the other axis as the axis of the dependent variable.

Then, in step 304, in the case where the x axis is determined as the axis of the independent variable in step 303, the engine unit 23 determines the angle of the slope of the regression line by calculating the angle of the slope by using Eq. (11). In the case where the y axis is determined as the axis of the independent variable in step 303, the engine unit 23 determines the angle of the slope of the regression line by calculating the angle of the slope by using Eq. (12) and subtracting the calculated angle from 90 degrees. In one example, when calculating the angle of the slope by using Eq. (11) or Eq. (12), the engine unit 23 calculates the angle within the ranges of 0 to 90 degrees and 270 to 360 degrees.

Then, in step 305, the engine unit 23 determines the amount of rotation, indicating whether or not the determined slope of the regression line is to be rotated by 180 degrees, on the basis of the displacement direction of the set of data points held in the first buffer. In one example, in the case where the x axis is determined as the axis of the independent variable in step 108, the engine unit 23 calculates the individual differences between the x-axis values temporally preceding and succeeding each other. The engine unit 23 determines that the amount of rotation be 180 degrees when the number of negative calculated differences is greater than the number of positive ones, while determining that the amount of rotation be 0 degrees when the former is less than the latter. In one example, in the case where the y axis is determined as the axis of the independent variable in step 108, the engine unit 23 calculates the individual differences between the y-axis values temporally preceding and succeeding each other. The engine unit 23 determines that the amount of rotation be 180 degrees when the number of negative calculated differences is greater than the number of positive ones, while determining that the amount of rotation be 0 degrees when the former is less than the latter.

Then, in step 306, the engine unit 23 determines and holds an angle on the basis of the determined slope of the regression line and the determined amount of rotation. In one example, the engine unit 23 determines an angle by adding the determined amount of rotation to the angle corresponding to the determined slope of the regression line. In the case where the amount of rotation is 0 degrees, the angle that is determined by the engine unit 23 corresponds to the determined slope of the regression line. The flowchart proceeds to step 308.

In step 307, the engine unit 23 determines (outputs) the angle that is held. In the case where there is no angle that is held, the engine unit 23 determines (outputs) data indicating that no angle is held, such as NULL. The flowchart proceeds to step 308.

In step 308, the flowchart proceeds to step 309 in the case where the flowchart is to be terminated, for example, due to closing of the game application, and otherwise returns to step 301. In step 309, the engine unit 23 terminates the holding of the angle.

The controller control unit 24 determines a converted weighted speed for each frame period by inputting the determined weighted speed to a prescribed function. The prescribed function is a function for determining values corresponding to input values and holding and determining (outputting) the maximum value among the determined values. The converted weighted speed determined by the controller control unit 24 is the weighted speed for determining parameters of the operable character, such as the direction and speed of movement. In one example, for each frame period, the controller control unit 24 inputs the determined weighted speed to the prescribed function. For each frame period, the prescribed function determines a value corresponding to the input value, and outputs and holds the greater one of the determined value and the maximum value among the values precedingly determined by the prescribed function. For example, the prescribed function holds the value output in the i-th frame, and uses the held value in the (i+1)-th frame as the maximum value among the values precedingly determined by the prescribed function. In one example, unless touchend or touchcancel is generated, the controller control unit 24 holds the value of the determined converted weighted speed in a prescribed storage area in the storage device 14, which can be referred to by other functional units or programs.

In one example, the prescribed function is an activation function f(s, p) that is defined by Eq. (13) using a function max{A, B}, which outputs the maximum value of A and B. The controller control unit 24 determines the output value of the activation function f(s, p) as the converted weighted speed.

$$f(s, p) = \max\{o( = s/C_1), p\} \qquad (13)$$

$$= \begin{cases} p, & s/C_1 < p \\ s/C_1, & s/C_1 \geq p \end{cases}$$

Here, s signifies the most recently determined output value (weighted speed) of the CPD function, and p signifies the value output and held immediately before by the activation function f(s, p). What is referred to by the value output immediately before is, in the case where the controller control unit 24 determines the output value (converted weighted speed) of the activation function f(s, p) in one frame, the output value of the activation function f(s, p), determined in the frame immediately preceding that frame. The activation function f(s, p) receives s as an input and determines a real value o in the range of 0 to 1, compares o with p, and outputs o if o is greater than or equal to p, while outputting p if o is less than p. Therefore, the output value of the activation function f(s, p) is never less than p. In this embodiment, the real value o is a value obtained by dividing the output value s of the CPD function by a prescribed constant $C_1$. For example, the prescribed constant $C_1$ is set to be the maximum value that the output value of the CPD function can take on, such that the real value o becomes a real value in the range of 0 to 1. Note that the range 0 to 1 of the real value o that is determined by the activation function f(s, p) may be other ranges of numerical values.

Figure 10:
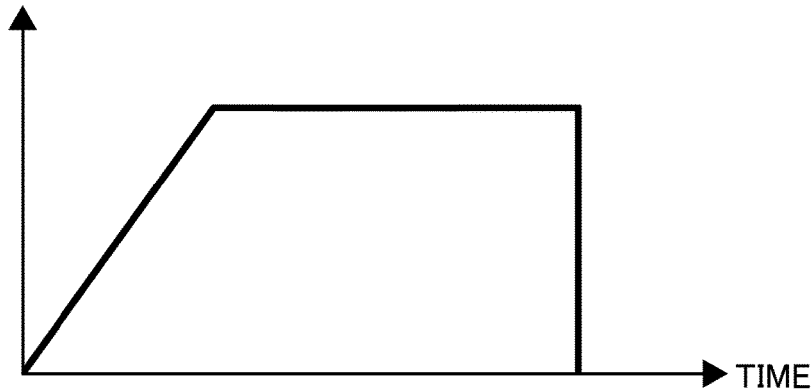
FIG. 10 shows an example of the output value of an activation function f(s, p).

Since the CPD function calculates values continuously on a per-frame basis, the output value thereof changes non-continuously in accordance with non-continuous movements of a user's finger, and often changes considerably. FIG. 10 shows an example of the output value of the activation function f(s, p). The output value of the activation function f(s, p) may increase as the time elapses but never decreases, and changes continuously. As described above, the activation function f(s, p) converts the values of the CPD function into stable output values. In the case where a touch event for quitting a touch (touchend) or for cancelling a touch (touchcancel) has been generated in response to a user's operation on the touch panel 12, the activation function f(s, p) quits holding p, and the output value thereof becomes zero or NULL.

Figure 11:
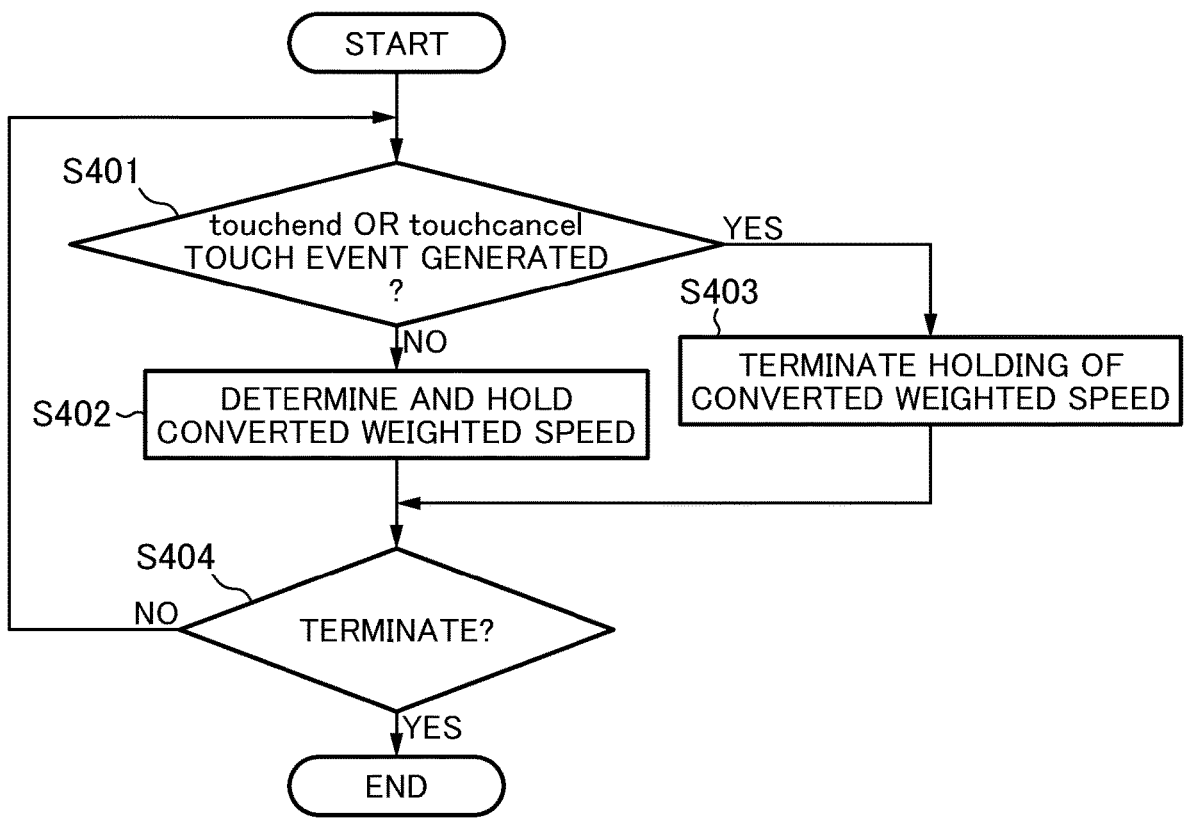
FIG. 11 is a flowchart for explaining processing for determining a converted weighted speed, which is executed on the electronic device according to the embodiment of the present invention.

FIG. 11 is a flowchart for explaining processing for determining a converted weighted speed, which is executed on the electronic device 10 according to the embodiment of the present invention. In one example, the electronic device 10 executes steps 401 to 404 in this flowchart for each frame period corresponding to the frame rate.

In step 401, the controller control unit 24 determines whether or not a touchend or touchcancel touch event has been generated. In one example, the controller control unit 24 determines whether or not such a touch event has been generated during one frame. In the case where neither touchend nor touchcancel has been generated, the flowchart proceeds to step 402 and then to step 404. In the case where touchend or touchcancel has been generated, the flowchart proceeds to step 403 and then to step 404.

In step 402, the controller control unit 24 determines a converted weighted speed by using Eq. (13). At this time, the controller control unit 24 holds the determined converted weighted speed in a prescribed storage area in the storage device 14. The converted weighted speed that is held is the value that is referred to, as p, when the controller control unit 24 uses Eq. (13) in the processing in step 402 in the next iteration. In one example, in step 402, which is executed for each period corresponding to the frame rate, the controller control unit 24 determines a converted weighted speed by using Eq. (13) as well as the most recent weighted speed determined in step 203, which is executed for each period corresponding to the frame rate.

In step 403, the controller control unit 24 quits holding the converted weighted speed.

The flowchart returns to step 401 unless terminated in step 404, for example, due to closing of the game application.

When the flowchart comes to an end, the controller control unit 24 quits holding the converted weighted speed.

For each frame period, the controller control unit 24 determines (generates) a resultant vector by using the angle determined by the engine unit 23 and the converted weighted speed determined by the controller control unit 24. In one example, the controller control unit 24 generates a resultant vector on the basis of the value of the converted weighted speed held in a prescribed storage area as well as a unit vector having the value of the angle held in a prescribed storage area. The controller control unit 24 holds data of the generated resultant vector in a prescribed storage area.

In one example, the controller control unit 24 determines (calculates) a resultant vector compose(v) by using Eq. (14).

$$\text{compose}(\vec{V}) = \begin{cases} (\vec{V_h} + \vec{V_a})/|\vec{V_h} + \vec{V_a}|, & |\vec{V_h} + \vec{V_a}| > 1.0 \\ \vec{V_h} + \vec{V_a}, & |\vec{V_h} + \vec{V_a}| \le 1.0 \end{cases} \quad (14)$$

$$\vec{V_a} = f(s, p) * \vec{e}/\gamma$$

Here, $$\vec{V_h}$$

signifies the resultant vector determined and held immediately before by the controller control unit 24, $$\vec{V_a}$$

signifies an additional vector that is to be added to the resultant vector held by the controller control unit 24, f(s, p) signifies the most recent converted weighted speed determined by the controller control unit 24, $$\vec{e}$$

signifies a unit vector having the angle determined by the engine unit 23, and γ signifies a weight for the additional vector. Note that the resultant vector determined and held immediately before in the case where the controller control unit 24 determines a resultant vector for one frame is a resultant vector determined and held in the frame immediately preceding that frame. As expressed in Eq. (14), the resultant vector $$\vec{V_h} + \vec{V_a}$$

is normalized such that the maximum value thereof does not exceed 1.0. Note that 1.0 serving as the maximum value of a resultant vector is an example, and the maximum value of a resultant vector may be other numerical values.

As expressed in Eq. (14), the controller control unit 24 determines an additional vector on the basis of a weight coefficient 1/γ, which is the inverse of the weight γ, and determines a resultant vector. Similarly to the weight coefficient β, the controller control unit 24 uses the weight coefficient 1/γ not as a static value but as a dynamic value corresponding to the angle determined by the engine unit 23 for each frame period. The controller control unit 24 calculates the weight coefficient 1/γ according to the components along the x axis direction and the y axis direction in the direction indicated by the angle determined by the engine unit 23 in the period of the frame being considered. In one example, the controller control unit 24 calculates the weight coefficient 1/γ by using Eq. (15).

$$\frac{1}{\gamma} = \frac{\sqrt{(a^2(\sin\theta)^2 + b^2(\cos\theta)^2)}}{a \cdot b} * \frac{1}{C_2} \quad (15)$$

Here, a and b are values indicating magnitudes corresponding to the lengths of the minor axis (x axis) and the major axis (y axis) or the major axis (x axis) and the minor axis (y axis) of a virtual ellipse having two axes on an x axis and a y axis preset on coordinate axes. The values a and b have different magnitudes. θ signifies an angle that is determined by the engine unit 23 for each frame period. As described above, regarding the weight coefficient 1/γ, the basic idea concerning a virtual ellipse is the same as that of the weight coefficient β. $C_2$ is a constant for adjusting the influence of the additional vector on the resultant vector determined and held by the controller control unit 24 immediately before. As the value of $C_2$ is increased, the magnitude of the additional vector becomes smaller, and thus acceleration becomes slower. For example, compared with f(s, p), whose maximum value is 1, the constant $C_2$ is set to be 20. a and b correspond to the lengths of the two axes of a virtual ellipse having two axes that are individually parallel to the x axis and the y axis, and the values of a and b may be chosen arbitrarily, for example, depending on the design of the virtual controller. Furthermore, since a·b is a constant, the value of a·b may be chosen arbitrarily, for example, depending on the design of the virtual controller.

Figure 12:
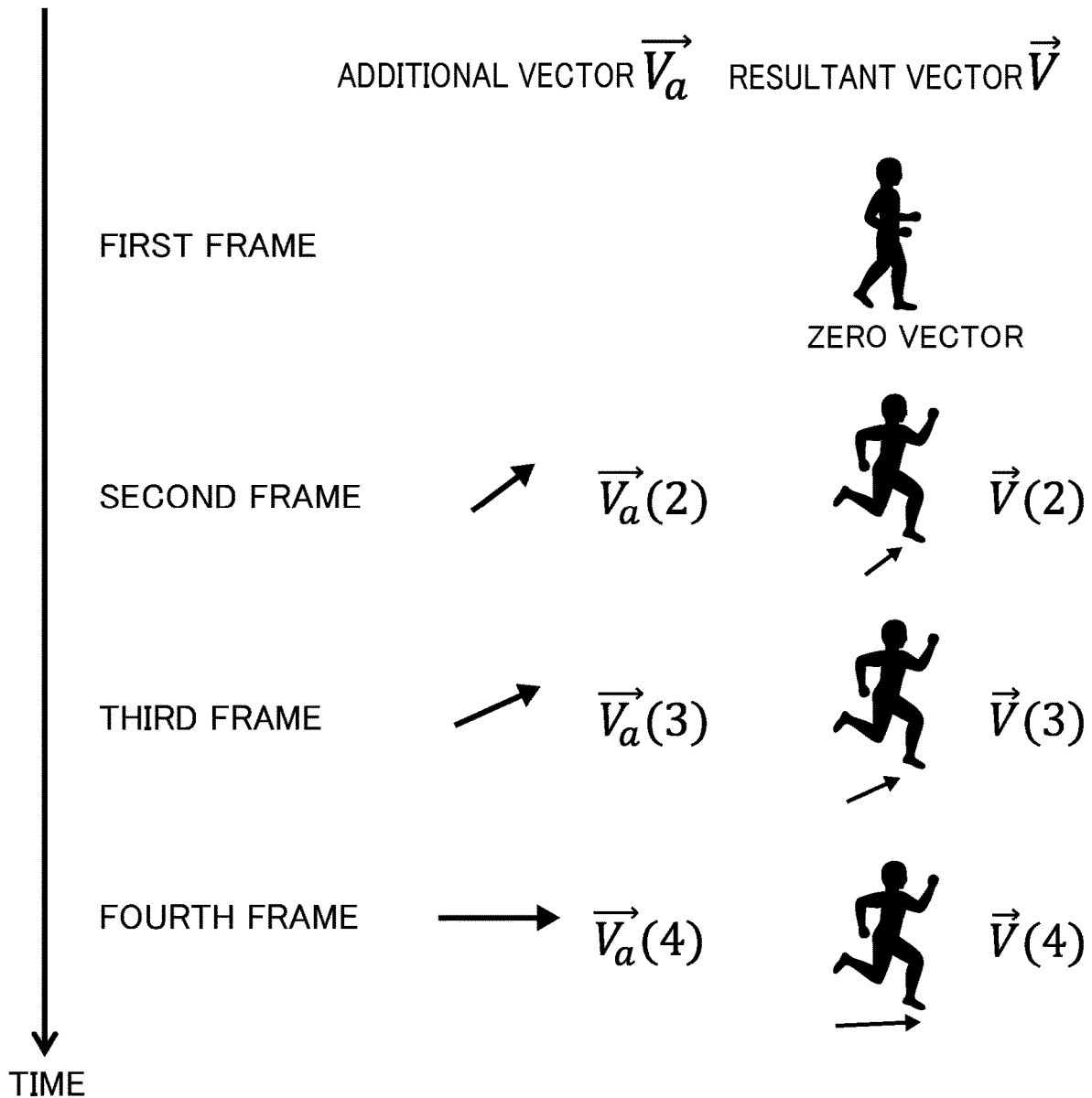
FIG. 12 shows an example of generation of resultant vectors by a controller control unit.

FIG. 12 shows an example of generation of a resultant vector by the controller control unit 24. The first frame assumes the case where the additional vector is a zero vector and the vector held by the controller control unit 24 is also a zero vector. In this case, the resultant vector is also a zero vector. The additional vector becomes a zero vector mainly in the case where the engine unit 23 does not acquire and hold data points, i.e., the case where no touch event is generated. In the following, the additional vector and the resultant vector for the i-th frame will be expressed respectively as follows.

$$\vec{V}_a(i), \vec{V}(i)$$

The second frame assumes the case where the additional vector is not a zero vector. In this case, since the vector held by the controller control unit 24 is a zero vector, the resultant vector is as follows.

$$\vec{V}(2) = \vec{V}_a(2)$$

It can be confirmed that the additional vector becomes the resultant vector as-is.

The third frame assumes the case where an additional vector is added further. In this case, the vector held by the controller control unit 24 is as follows.

$$\vec{V}(2)$$

Thus, the resultant vector becomes as follows.

$$\vec{V}(3) = \vec{V}(2) + \vec{V}_a(3)$$

The resultant vector is the sum vector of the vector held by the controller control unit 24 and the additional vector.

The fourth frame assumes that case where an additional vector is further added, whereby the magnitude (norm) of the resultant vector exceeds 1. In this case, the resultant vector becomes as follows.

$$\vec{V}(4) = (\vec{V}(3) + \vec{V}_a(4)) / |\vec{V}(3) + \vec{V}_a(4)|$$

The resultant vector is a sum vector of the vector held by the controller control unit 24 and the additional vector, and has a norm of 1.

In this embodiment, the engine unit 23 determines an angle and a weighted speed for each frame period, and the controller control unit 24 determines a converted weighted speed for each frame period. The controller control unit 24 is configured to be able to determine an additional vector and to determine a resultant vector for each frame in the manner described above.

The direction (angle) and magnitude of the resultant vector determined by the controller control unit 24 correspond to the input of a direction and a magnitude via the virtual controller. It can also be said that the resultant vector is a vector having a direction and a magnitude intended by the user who has performed a touch operation. From what has been described above, the converted weighted speed, the angle, and the weight coefficient 1/γ, used in determining an additional vector, contribute to the input of a direction and a magnitude via the virtual controller. Furthermore, the weighted speed used in determining a converted weighted speed, as well as the weight coefficient β used in determining a weighted speed, also contribute to the input of a direction and a magnitude via the virtual controller. However, in this embodiment, the concept of a virtual controller is not necessary, and it suffices for the controller control unit 24 to be able to generate (determine) a resultant vector for each frame and to pass the determined resultant vector to the application unit 25.

The application unit 25 corresponds to a specific game application that implements actions, etc. in the game. For example, the application unit 25 is a function implemented in a game app installed in the electronic device 10. Similarly to game applications in general, the game application processes the main loop of the main program, for example, for each period corresponding to the frame rate. Alternatively, the application unit 25 may correspond to an input aid application or a simulation application for causing an operable object to perform actions in response to user operations.

Figure 13:
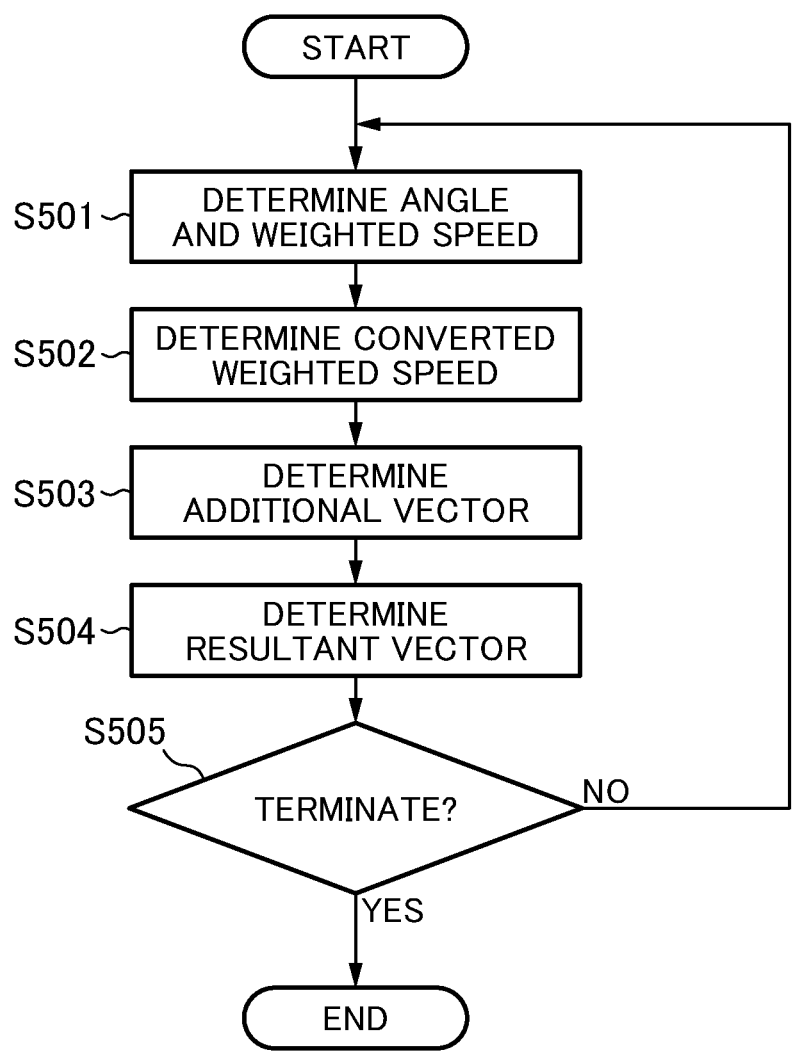
FIG. 13 is a flowchart for explaining processing for determining a resultant vector, which is executed on the electronic device according to the embodiment of the present invention.

FIG. 13 is a flowchart for explaining processing for determining a resultant vector, which is executed on the electronic device 10 according to the embodiment of the present invention. In one example, the electronic device 10 executes steps 501 to 505 in the flowchart for each period corresponding to the frame rate.

In step 501, the engine unit 23 determines an angle through processing corresponding to step 306 or 307, and determines a weighted speed through processing corresponding to step 203. In step 502, the controller control unit 24 determines a converted weighted speed through processing corresponding to step 402.

In step 503, the controller control unit 24 determines an additional vector, expressed as follows, by using the angle determined in step 501, the converted weighted speed determined in step 502, and Eq. (14).

$$\vec{V}_a$$

In step 504, on the basis of the sum of the additional vector determined in step 503, expressed as follows, $$\vec{V}_a$$

and the resultant vector determined and held by the controller control unit 24 immediately before, expressed as follows, $$\vec{V}_h$$

the controller control unit 24 determines and holds a resultant vector expressed as follows.

compose($\vec{V}$)

The resultant vector that is held is a resultant vector determined and held immediately before, expressed as follows, which is referred to by the controller control unit 24 in the processing in step 504 in the next iteration.

$$\vec{V_h}$$

The flowchart returns to step 501 unless terminated in step 505, for example, due to closing of the game application. When the flowchart comes to an end, the controller control unit 24 quits holding the resultant vector.

In one example, the angle and magnitude of the resultant vector generated by the controller control unit 24 are converted into parameters of the operable character, concerning motions, etc. of the operable character. In one example, the application unit 25 executes processing so that the direction and magnitude of the resultant vector, determined for each frame period, will individually become the movement direction and movement speed of the operable character in that frame period. In one example, the application unit 25 determines the status of movement of the operable character on the basis of the magnitude of the resultant vector. For example, the application unit 25 determines the status of movement as follows: (a) "walking" when the magnitude of the resultant vector is less than or equal to a threshold t1; (b) "walking fast" when the magnitude is greater than the threshold t1 and is less than or equal to a threshold t2; and (c) "running" when the magnitude is greater than the threshold t2.

Next, the main operations and advantages of the electronic device 10 according to the embodiment of the present invention will be described.

The engine unit 23 acquires data points on the basis of touch events generated in response to user operations on the touch panel 12, and stores the data points in the first buffer.

On the basis of the data points stored in the first buffer, the engine unit 23 determines an angle indicated by the set of data points for each frame period. For example, in determining the angle, the engine unit 23 terminates the holding of data points with which a predefined holding period has expired among the data points held in the first buffer, determines the slope of the regression line on the basis of the data points held in the first buffer, determines the amount of rotation indicating whether or not the determined slope of the regression line is to be rotated by 180 degrees, and determines an angle on the basis of the determined slope of the regression line and the determined amount of rotation.

For each frame period, the engine unit 23 holds the data points held in the first buffer in the second buffer as a data point sequence. The engine unit 23 determines a displacement speed in the data point sequences held in the second buffer on the basis of displacements of data points in the data point sequences, and determines a weighted speed at least on the basis of the variation (deviation) of the most recently determined displacement speed from the average of precedingly determined displacement speeds. For example, for each frame period, the engine unit 23 determines a weighted speed by using the CPD function in Eq. (3). For each frame period, the controller control unit 24 inputs the determined weighted speed to the activation function f(s, p) for determining a value corresponding to the input value, thereby determining a converted weighted speed.

For each frame period, the controller control unit 24 determines a resultant vector on the basis of the determined converted weighted speed, a unit vector having the determined angle, and the weight coefficient $1/\gamma$. For example, the controller control unit 24 calculates a resultant vector by using Eq. (14).

In this manner, it is possible to output a resultant vector corresponding to the input of a direction and a magnitude via the virtual controller.

In this embodiment, in calculating a displacement speed, the engine unit 23 calculates a weight coefficient $\beta$ by using Eq. (5) and an angle determined by the engine unit 23, and determines a displacement speed by using Eq. (4) and the calculated weight coefficient $\beta$. The displacement speed corresponds to the speed of displacement of data points during the period of the frame being considered, and can be interpreted as corresponding to the movement speed of a user's finger. The displacement speed becomes greater as the value of the weight coefficient $\beta$ becomes greater. For example, in the case of a design in which it is easy to accelerate an operable character, the weight coefficient $\beta$ is set to be a relatively large value. It has hitherto been the case to set a constant value for the weight coefficient $\beta$. In this embodiment, the weight coefficient $\beta$ gives a weight corresponding to the inverse of the magnitude of the radius at an angle $\theta$ of an ellipse having preset different lengths a and b as the lengths of the individual axes, as expressed in Eq. (5). Therefore, with the weight coefficient $\beta$, it becomes possible to give smaller values (weights) to inputs along the major axis direction of the ellipse, while giving greater values (weights) to inputs along the minor axis direction of the ellipse. This enables a configuration such that relatively large displacement speeds are calculated only for inputs along a specific axis direction: for example, it becomes possible to prepare a design with which it is easy to accelerate an operable character only in response to inputs along a specific axis direction.

Furthermore, in this embodiment, in calculating a resultant vector, the controller control unit 24 calculates a weight coefficient $1/\gamma$ by using an angle determined by the engine unit 23 and Eq. (15). Regarding the weight coefficient $1/\gamma$, as expressed in Eq. (15), the basic idea concerning a virtual ellipse is the same as that of the weight coefficient $\beta$. Therefore, with the weight coefficient $1/\gamma$, it becomes possible to give smaller values (weights) to inputs along the major axis direction of the ellipse, while giving greater values (weights) to inputs along the minor axis direction of the ellipse. This enables a configuration in which additional vectors having relatively large norms are calculated only with inputs along a specific axis direction: for example, it becomes possible to prepare a design in which it is easy to accelerate an operable character only with inputs along a specific axis direction.

As described above, in this embodiment, in calculating a resultant vector, when the engine unit 23 calculates a weighted speed and when the controller control unit 24 calculates a resultant vector in each frame, it is possible to give a weight corresponding to the inverse of the magnitude of the radius, corresponding to the input direction, of a preset virtual ellipse. This makes it possible to input greater values only with inputs along a specific axis direction, which makes it possible to realize an input method for assisting inputs along a direction in which it is difficult for a user to tilt a finger. For example, by adjusting or switching the lengths of the two axes of the virtual ellipse in accordance with preferences and the shape of a finger of a user or the portrait or landscape usage mode of the touch panel 12, it becomes possible to flexibly assist acceleration in directions such as a direction in which it is difficult for the user to tilt the finger. As described above, it becomes possible to readily customize a virtual controller in accordance with the game content or habits of a user. This makes it possible to realize a virtual controller having improved ease of operation, i.e., an input method with which it is easier for a user to perform operations.

Note that in the case where the weight coefficient is a constant, the virtual controller is configured so as to apply the same weight to inputs along all the directions over 360°, and for example, calculates resultant vectors so as to equally accelerate an operable character. This type of virtual controller simulates the behavior of a joystick that is moved within the range of a true circle, and consideration is not paid to inputs in directions in which it is difficult to move a finger. By providing an input method simulating the behavior of a joystick that is moved within the range of an ellipse having the lengths of the two axes thereof customized, as in this embodiment, it becomes possible to realize an input method with which consideration is paid to inputs in directions in which it is difficult to move a finger.

Furthermore, in this embodiment, the CPD function outputs a greater value when the displacement speed of each frame, which is to be held, is greater than the average of the displacement speeds up to the immediately preceding frame. In the case where the user has quickly moved a finger intentionally, the finger is necessarily accelerated for a certain time, and thus the CPD function outputs a greater value. In the case where the displacement speed is increased only during the period of one frame due to the status of contact between the touch panel 12 and the finger, the displacement speed is levelled by multiplication with 1/n, and thus the CPD function does not output an extremely large value, in particular, when the n is the maximum value. As described above, the output value of the CPD function becomes large in the case where a finger is continuously being accelerated intentionally, while not becoming large when a finger is not being accelerated intentionally, so that the output value of the CPD function can have a magnitude corresponding to an intuitive operation by the user. Furthermore, the CPD function absorbs habits of and differences among individual users concerning the speed of finger movement by using a variation (deviation) with respect to the average. This makes it possible for the electronic device 10 to detect only intentional accelerations by using the CPD function.

Meanwhile, since the CPD function calculates values successively on a per-frame basis, the CPD function often outputs values that change non-continuously with non-continuous movements of a user's finger. In this embodiment, by inputting the output of the CPD function to the activation function f(s, p), which has a ratchet-like property of outputting a value not less than an immediately preceding output value p, it is possible to convert the output values of the CPD function into more stable output values. This configuration makes it possible to convert the output values of the CPD function, which reflect the speeds of non-continuous finger movements, into more stable output values. This makes it possible to stabilize the values of parameters such as the movement direction and movement speed of an operable character, while reflecting inputs intended by the user. This makes it possible to realize an input method that makes it easier for the user to perform operations.

Furthermore, in this embodiment, the activation function f(s, p) quits holding the maximum value in the case where a touch event for quitting a touch or cancelling a touch has been generated due to a user operation on the touch panel 12. With this configuration, it becomes possible to convert unstable output values of the CPD function, reflecting the speeds of non-continuous finger movements, into stable output values only while a touch is being continued, and to make the output value zero upon the termination of the continued touch.

Furthermore, in this embodiment, as described earlier, the engine unit 23 determines an angle, and the controller control unit 24 determines (outputs) a resultant vector on the basis of a determined converted weighted speed and a unit vector having the determined angle. In this manner, in this embodiment, it becomes possible to determine (output) a resultant vector having a direction and a magnitude intended by the user who has performed a touch operation on the touch panel 12. With the configuration for outputting a resultant vector in this manner, it becomes possible to convert the values of an angle and a speed (weighted speed), determined (calculated) by the engine unit 23, into parameters of an operable character, such as motion of the operable character. Alternatively, it becomes possible to convert the values of an angle and a speed (weighted speed), determined (calculated) by the engine unit 23, into the input of a direction and a magnitude via a virtual controller. This makes it possible to realize a virtual controller that has improved responsiveness and that better matches user's intuitions. For example, with a resultant vector, additional vectors are continually added while a touch is being continued. When a finger is rolled into a direction D1 and then the finger is rolled into a direction D2 that is the exact opposite of the direction D1, the magnitude of the resultant vector temporarily decreases, as expressed in Eq. (14). Then, the resultant vector becomes a vector having a greater norm and oriented in the direction D2, which matches user's intuitions.

In this embodiment, the engine unit 23 is configured to successively calculate angles and weighted speeds on the basis of touch events generated during an extremely short period. Thus, it becomes possible to calculate an angle and a magnitude input to the virtual controller or parameters of the operable character, without having to use past touched coordinates as reference points. As described above, in this embodiment, the electronic device 10 calculates angles and magnitudes without employing spatial concepts such as start points (start coordinates) and end points (end coordinates), which have been employed with virtual controllers in existing technologies.

Furthermore, in this embodiment, with the electronic device 10, as opposed to virtual controllers in existing technologies, inputs are not based on the distance of movement of a finger from reference coordinates. Thus, it becomes possible to realize operations intended by the user with operations requiring less amounts of finger movement. Therefore, as compared with existing technologies, it becomes possible to realize operations with a smaller implementation area. For example, it becomes possible to realize the same operational features irrespective of the size of the touch panel 12.

The operations and advantages described above also apply similarly to other embodiments and other examples unless otherwise specifically mentioned.

Another embodiment of the present invention may be a program for realizing the functions or the information processing shown in the flowcharts in the above-described embodiment of the present invention, or a computer-readable storage medium storing the program. Furthermore, another embodiment of the present invention may be a method for realizing the functions or the information processing shown in the flowcharts in the above-described embodiment of the present invention. Furthermore, another embodiment of the present invention may be a server that is capable of providing a computer with a program for realizing the functions or the information processing shown in the flowcharts in the above-described embodiment of the present invention. Furthermore, another embodiment of the present invention may be a virtual machine for realizing the functions or the information processing shown in the flowcharts in the above-described embodiment of the present invention.

Now, modifications of the embodiment of the present invention will be described. The following descriptions will be directed mainly to differences from the embodiment of the present invention. The modifications described below can be combined as appropriate and applied to any embodiment or modification of the present invention as long as no inconsistency arises.

In one modification, the weight coefficient $1/\gamma$ is a constant, and the controller control unit 24 does not calculate the weight coefficient $1/\gamma$ by using Eq. (15). Also in this modification, since the engine unit 23 calculates the weight coefficient $\beta$ by using Eq. (5), it becomes possible to realize a configuration such that relatively large displacement speeds will be calculated only with inputs along a specific axis direction.

In one modification, the weight coefficient $\beta$ is a constant, and the engine unit 23 does not calculate the weight coefficient $\beta$ by using Eq. (5). Also in this modification, since the controller control unit 24 calculates the weight coefficient $1/\gamma$ by using Eq. (15), it becomes possible to realize a configuration with which additional vectors having relatively large norms are calculated only with inputs along a specific axis direction.

In one embodiment, the weight coefficient $\beta$ does not give a weight corresponding to the inverse of the magnitude of the radius at an angle $\theta$ of an ellipse having preset different lengths a and b as the lengths of the individual axes, as expressed in Eq. (5). Instead, the weight coefficient $\beta$ gives a weight corresponding to the inverse of the length from the center to one side of a polygon at an angle $\theta$, the polygon having a shape or properties similar to those of an ellipse having preset different lengths a and b as the lengths of the individual axes. The length from the center to one side of the polygon at the angle $\theta$ of the polygon is the length between the center and the intersection of a straight line extending at the angle $\theta$ from the center and one side of the polygon. Thus, with the weight coefficient $\beta$, it is possible to give a weight that is similar to the one calculated by using Eq. (5). For example, the polygon having a shape or properties similar to those of an ellipse having a and b as the lengths of the individual axes is a polygon circumscribing the ellipse or a polygon inscribing the ellipse. The engine unit 23 can calculate the weight coefficient $\beta$ according to components along the x axis direction and y axis direction in the direction indicated by the angle $\theta$; alternatively, the engine unit 23 may calculate the weight coefficient $\beta$ by using a function based on a polygon, such as the one in this modification. Also with the weight coefficient $1/\gamma$, instead of the weight coefficient $\beta$ or in addition to the weight coefficient $\beta$, it is possible to give a weight corresponding to the inverse of the length from the center to one side of a polygon at an angle $\theta$, the polygon having a shape or properties similar to those of an ellipse having preset different lengths a and b as the lengths of the individual axes. The controller control unit 24 can calculate the weight coefficient $1/\gamma$ according to components along the x axis direction and the y axis direction in the direction indicated by the angle $\theta$; alternatively, the controller control unit 24 may calculate the weight coefficient $1/\gamma$ by using a function based on a polygon, such as the one in this modification.

In one modification, the controller control unit 24 does not calculate a converted weighted speed, and calculates a resultant vector by using a weighted speed, which is the output value of the CPD function, instead of f(s, p) in Eq. (14). This modification is not configured such that the output values of the CPD function are converted into stable output values. Also with this modification, it becomes possible to realize a configuration with which additional vectors having relatively large displacement speeds or relatively large norms are calculated only with inputs along a specific axis direction; for example, it becomes possible to prepare a design with which it is easy to accelerate an operable character only with inputs along a specific axis direction.

In one modification, the prescribed function is configured to determine a value corresponding to an input value by determining a constant having a magnitude corresponding to a prescribed threshold when the input value is greater than or equal to the threshold, instead of using Eq. (13). For example, the prescribed function is an activation function $f_1(s, p)$ defined by Eq. (16). s and p are the same as those in the case of f(s, p) in Eq. (13): i.e., s, which is the output value of the CPD function, is the input, and p is the value output by $f_1(s, p)$ immediately before.

$$f_1(s, p) = \begin{cases} a_1, s \le t_1 \land p < b_1 \\ b_1, (t_1 < s \le t_2 \land p < 1.0) \lor (s \le t_2 \land b_1 \le p < 1.0) \\ 1.0, s > t_2 \lor p \ge 1.0 \end{cases} \quad (16)$$

Figure 14:
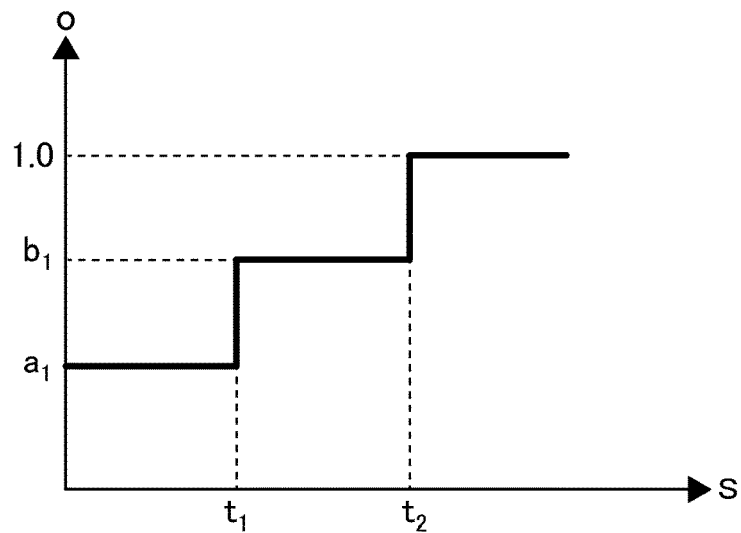
FIG. 14 shows an example relationship between an input s to an activation function $f_1(s, p)$ and a value o that is determined in relation to the input s.

With s as the input, the activation function $f_1(s, p)$ outputs (determines) one of a real number $a_1$, a real number $b_1$, and 1.0 ($a_1 < b_1 < 1.0$) by way of comparison against thresholds $t_1$ and $t_2$ ($t_1 < t_2$) as well as comparison of the value of p with b1 and 1.0. Alternatively, the activation function $f_1(s, p)$, with s as the input, determines o, which is one of the real number $a_1$, the real number $b_1$, and 1.0, by way of comparison against the thresholds $t_1$ and $t_2$, and outputs the greater one of o and p. While a touch is being continued, $f_1(s, p)$ outputs $a_1$ while s has never exceeded $t_1$, outputs b1 once s has taken on a value greater than $t_1$ and less than or equal to $t_2$, and outputs 1.0 once s has taken on a value exceeding $t_2$. FIG. 14 shows an example relationship between the input s to the activation function $f_1(s, p)$ and the value o that is determined in relation to the input s.

With the configuration for converting the output values of the CPD function, reflecting the speeds of non-continuous finger movements, into a plurality of stepwise values corresponding to the magnitudes thereof, it becomes possible to convert the output values into more stable output values.

In one modification, instead of Eq. (13), the prescribed function is configured to determine a value corresponding to an input value by applying a function for mapping the input value to a value within a certain range. As an example, the prescribed function is an activation function $f_2(s, p)$ defined by Eq. (17). s and p are the same as those in the case of f(s, p) in Eq. (13): i.e., s, which is the output value of the CPD function, is the input, and p is the value output by $f_2(s, p)$ immediately before.

$$f_2(s, p) = \begin{cases} p, a_2 s + b_2 < p \\ a_2 s + b_2, a_2 s + b_2 \ge p \end{cases} \quad (17)$$

Figure 15:
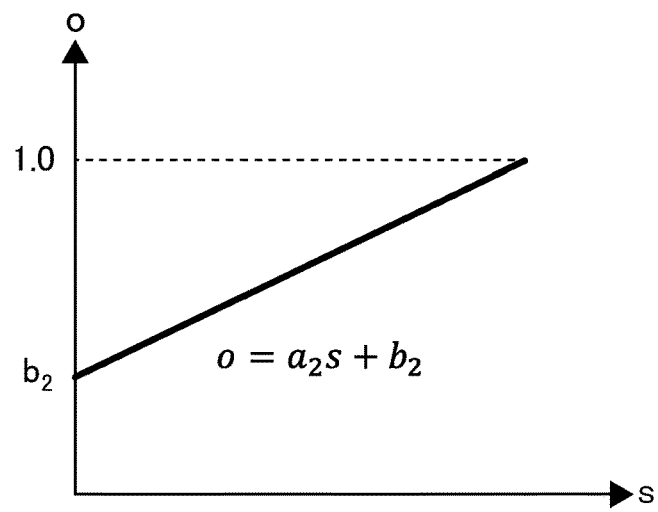
FIG. 15 shows an example relationship between an input s to an activation function $f_2(s, p)$ and a value o that is determined in relation to the input s.

The activation function $f_2(s, p)$, with s as the input, determines the value $o=a_2s+b_2$, and outputs (determines) the greater one of o and p. FIG. 15 shows an example relationship between the input s to the activation function $f_2(s, p)$ and the value o that is determined in relation to the input s.

As an example, the prescribed function is an activation function $f_3(s, p)$ defined by Eq. (18). s and p are the same as those in the case of f(s, p) in Eq. (13): i.e., s, which is the output value of the CPD function, is the input, and p is the value output by $f_3(s, p)$ immediately before.

$$f_3(s, p) = \begin{cases} p, & a_3e^s + b_3 < p \\ a_3e^s + b_3, & a_3e^s + b_3 \geq p \end{cases} \quad (18)$$

Figure 16:
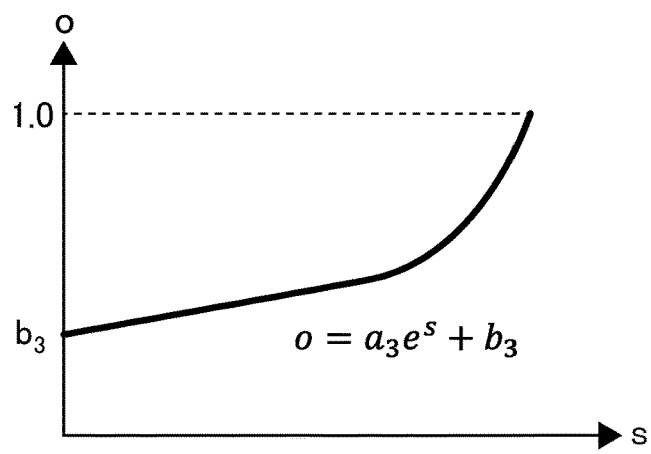
FIG. 16 shows an example relationship between an input s to an activation function $f_3(s, p)$ and a value o that is determined in relation to the input s.

An activation function $f_3(s, p)$, with s as the input, determines the value $o=a_3e^s+b_3$, and outputs (determines) the greater one of o and p. FIG. 16 shows an example relationship between the input s to the activation function $f_3(s, p)$ and the value o that is determined in relation to the input s.

With this configuration, it becomes possible to realize desired motion of an operable character, while converting the output values of the CPD function, reflecting the speeds of non-continuous finger movements, into more stable output values.

In one modification, the weight coefficient β and the weight coefficient 1/γ are constants. This modification is not configured such that consideration is paid to inputs along a direction in which it is difficult to move a finger. However, with this modification, the controller control unit 24 calculates a converted weighted speed and calculates an additional vector. Thus, it becomes possible to attain stable values of parameters such as the movement direction and movement speed of the operable character, while reflecting inputs intended by the user. This makes it possible to realize an input method that makes it easier for a user to perform operations.

In one modification, the engine unit 23 holds a data point sequence in the second buffer at prescribed timings, for example, for each prescribed period that is different from the period corresponding to the frame rate. In one modification, the engine unit 23 determines a displacement speed and determines a weighted speed at prescribed timings, for example, for each prescribed period that is different from the period corresponding to the frame rate. In one example, the controller control unit 24 determines a converted weighted speed at prescribed timings, for example, for each prescribed period that is different from the period corresponding to the frame rate. In one modification, the controller control unit 24 generates a resultant vector at predetermined timings, for example, for each prescribed period that is different from the period corresponding to the frame rate.

In one modification, the first buffer includes a buffer B1 for determining a weighted speed and a buffer B2 for determining an angle. For example, the two buffers B1 and B2 are configured to have mutually different holding periods. The engine unit 23 holds one or more data points held in the buffer B1 in the second buffer as a data point sequence.

In one modification, the engine unit 23 defines a variable V, and calculates and determines an angle by using the function aop(x, y) in the case where the variance of the independent variable is greater than or equal to V. In the case where the variance of the independent variable is less than V, the engine unit 23 determines the angle that is held, without calculating an angle. The case where the variance of the independent variable is less than V indicates the situation where n data points P are locally concentrated. Therefore, with the variable V set by the engine unit 23, it becomes possible to calculate an angle stably, while disregarding finger movements that are too fine. For example, the variable V is set to be 0.7.

In one modification, the engine unit 23 calculates the slope of a regression line by using a known method other than the method of least squares. In this case, the engine unit 23 does not determine the amount of rotation indicating whether or not the determined slope of the regression line is to be rotated by 180 degrees, and thus does not determine the axis of the independent variable and the axis of the dependent variable. For example, it is possible to use an algorithm such as the Kalman filter or particle filters.

In one modification, the engine unit 23 does not define the variable Da, and does not terminate the holding of a data point for which it is determined that the predefined holding period has expired among the data points held in the first buffer. In this case, the engine unit 23 determines an angle while referring to data points stored during a specific time band that is shifted in units of a prescribed period.

In one modification, when obtaining a touch event, the engine unit 23 obtains a set (x, y) of numerical values consisting of two variables, and stores the set (x, y) of numerical values consisting of the two variables in the first buffer without associating a data-point acquisition time t therewith. For example, the engine unit 23 can store information corresponding to a data-point acquisition time t in a memory area or the like in the storage device 14, other than the first buffer, and can manage the information in association with data stored in the first buffer.

The processing or operation described above may be modified freely as long as no inconsistency arises in the processing or operation, such as an inconsistency that a certain step utilizes data that could not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

10 Electronic device
11 Processor
12 Input device, touch panel
13 Display device
14 Storage device
15 Communication device
16 Bus
21 Input unit
22 Display unit
23 Engine unit
24 Controller control unit
25 Application unit
31, 33, 35 Angle
32, 34, 36 Direction
41 Angle
42 Vector

The invention claimed is:

1. A method that is executed on a computer equipped with a touch panel, the method comprising:
    a step of determining an angle indicated by a set of data points and based on the set of data points, the set of data points being indicated by a first plurality of values along a first axis and a second plurality of values along a second axis, the first plurality of values and the second plurality of values being acquired based on a first touch event generated in response to a user operation on the touch panel;
    a step of holding, for a plurality of predefined holding periods, one or more data points among the set of data points as a data point sequence to produce a held data point sequence, the one or more data points being indicated by a first portion of the first plurality of values along the first axis and a second portion of the second plurality of values along the second axis; and
    a step of determining, based on a displacement of data points in the held data point sequence, a displacement speed among a plurality of displacement speeds corresponding to a speed at which a position of generation of the first touch event becomes displaced in the held data point sequence, and
    a step of determining, at least based on a variation of a most recently determined displacement speed with respect to an average of precedingly determined displacement speeds among the plurality of displacement speeds, a weighted speed for determining a parameter of an operable object in a virtual space,
    wherein, in the step of determining the weighted speed, a weight coefficient is calculated according to components along a first direction of the first axis and a second direction of the second axis in a third direction indicated by the determined angle, and the displacement speed is determined further based on the weight coefficient.

2. The method according to claim 1, wherein:
    in the step of holding the one or more data points as the held data point sequence, at least one data point is held in the held data point sequence for each period of the plurality of predefined holding periods corresponding to a frame rate, and
    in the step of determining the weighted speed, based on a displacement of the at least one data point in the data point sequence held during a period of one frame, a displacement speed corresponding to a speed at which the position of generation of the first touch event becomes displaced in that frame is determined, and the weighted speed is determined at least based on a variation of the displacement speed in a most recent frame with respect to an average of a plurality of displacement speeds in a plurality of frames preceding the most recent frame.

3. The method according to claim 1,
    wherein the step of determining the angle includes:
    a step of holding a plurality of data points indicated by values along the first axis and values along the second axis, these values being acquired based on a second touch event generated in response to a user operation on the touch panel;
    a step of terminating a holding of a data point for which a predefined holding period among the plurality of predefined holding periods has expired among the held data point sequence;
    a step of determining a slope of a regression line based on the held data point sequence;
    a step of determining an amount of rotation by which the slope of the regression line is to be rotated, based on a displacement direction of the held data point sequence as a set; and
    a step of determining an angle based on the slope of the regression line and the amount of rotation, and
    wherein the method comprises:
    a step of determining, for each predefined holding period among the plurality of predefined holding periods, a resultant vector for determining a parameter of the operable object in the virtual space based on the weighted speed, a unit vector having the angle, and the weight coefficient calculated according to a plurality of components along the first direction of the first axis and the second direction of the second axis in the third direction indicated by the angle.

4. The method according to claim 3, wherein a fourth direction of the resultant vector is a movement direction of the operable object, and a magnitude of the resultant vector is a movement speed of the operable object.

5. The method according to claim 4, comprising a step of determining a movement status of the operable object based on the magnitude of the resultant vector.

6. A non-transitory computer readable medium storing a program for causing a computer to execute the steps of the method according to claim 1.

7. A method that is executed on a computer equipped with a touch panel, the method comprising:
    a step of holding a plurality of data points indicated by a first plurality of values along a first axis and a second plurality of values along a second axis to produce a plurality of held data points, the first plurality of values and the second plurality of values being acquired based on a touch event generated in response to a user operation on the touch panel;
    a step of terminating a holding of a data point among the plurality of data points for which a predefined holding period among a plurality of predefined holding periods has expired among the plurality of held data points;
    a step of determining a slope of a regression line based on the plurality of held data points;
    a step of determining an amount of rotation by which the slope of the regression line is to be rotated, based on a displacement direction of the plurality of held data points as a set;
    a step of determining an angle based on the slope of the regression line and the amount of rotation; and
    a step of determining, for each predefined holding period among the plurality of predefined holding periods, a resultant vector for determining a parameter of an operable object in a virtual space based on a unit vector having the angle, as well as a weight coefficient calculated according to a plurality of components along a first direction of a first axis and a second direction of a second axis at the angle.

8. An electronic device equipped with a touch panel, the electronic device comprising:
    a computer processor; and
    a memory connected to the computer processor, wherein the memory comprises:
        an angle indicated by a set of a plurality of data points is determined based on a plurality of data points, the plurality of data points being indicated by a first plurality of values along a first axis and a second plurality of values along a second axis, the first plurality of values and the second plurality of values being acquired based on a touch event generated in response to a user operation on the touch panel;

for each predefined holding period among a plurality of predefined holding periods, one or more data points are held as a data point sequence to produce a held data point sequence, the one or more data points being indicated by the first plurality of values along the first axis and second plurality of values along the second axis;

based on a displacement of data points in the held data point sequence, a plurality of displacement speeds comprising a displacement speed corresponding to a speed at which a position of generation of the touch event becomes displaced in the held data point sequence is determined, and at least based on a variation of a most recently determined displacement speed among the plurality of displacement speeds with respect to an average of precedingly determined displacement speeds among the plurality of displacement speeds, a weighted speed for determining a parameter of an operable object in a virtual space is determined; and in response to determining the weighted speed, a weight coefficient is calculated according to a plurality of components along a first direction of a first axis and a second direction of a second axis in a third direction indicated by the angle, and the displacement speed is determined further based on the weight coefficient.

9. An electronic device equipped with a touch panel, the electronic device comprising:
   a computer processor; and
   a memory connected to the computer processor, wherein the memory comprises:
      a plurality of data points indicated by a first plurality of values along a first axis and a second plurality of values along a second axis are held to produce a plurality of held data points, the first plurality of values and the second plurality of values being acquired based on a touch event generated in response to a user operation on the touch panel;
      holding of a data point for which a predefined holding period among a plurality of predefined holding periods has expired among the plurality of held data points is terminated;
      a slope of a regression line is determined based on the plurality of held data points;
      an amount of rotation by which the slope of the regression line is to be rotated is determined based on a displacement direction of the plurality of held data points as a set;
      an angle is determined based on the slope of the regression line and the amount of rotation; and
      for each predefined holding period among a plurality of predefined holding periods, a resultant vector for determining a parameter of an operable object in a virtual space is determined based on a unit vector having the angle, as well as a weight coefficient calculated according to a plurality of components along a first direction of a first axis and a second direction of a second axis at the angle.

* * * * *